United States Patent
Park et al.

(10) Patent No.: US 9,532,214 B2
(45) Date of Patent: Dec. 27, 2016

(54) APPARATUS AND METHOD FOR GENERATING KEY HIERARCHY IN WIRELESS NETWORK

(71) Applicant: Samsung Electronics Co., Ltd., Suwon-si, Gyeonggi-do (KR)

(72) Inventors: Jung-Shin Park, Seoul (KR); Yegin Alper, Istanbul (TR); Dae-Gyun Kim, Seongnam-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 14/253,154

(22) Filed: Apr. 15, 2014

(65) Prior Publication Data

US 2014/0307873 A1   Oct. 16, 2014

(30) Foreign Application Priority Data

Apr. 16, 2013 (KR) .......................... 10-2013-0041525

(51) Int. Cl.
*H04K 1/00* (2006.01)
*G06F 7/04* (2006.01)
(Continued)

(52) U.S. Cl.
CPC .............. *H04W 12/04* (2013.01); *H04W 12/02* (2013.01); *H04L 63/08* (2013.01); *H04W 12/06* (2013.01); *H04W 12/12* (2013.01)

(58) Field of Classification Search
CPC ...... H04W 12/02; H04W 12/06; H04W 12/12; H04L 63/08
(Continued)

(56) References Cited

U.S. PATENT DOCUMENTS

2006/0182034 A1 *  8/2006  Klinker ............... H04L 12/2602
                                                              370/238
2006/0234676 A1 * 10/2006  Harris ................... H04W 12/06
                                                              455/410
(Continued)

FOREIGN PATENT DOCUMENTS

JP          2010529755 A      8/2010
KR   10-2006-0034985 A      4/2006
(Continued)

*Primary Examiner* — Aravind Moorthy
(74) *Attorney, Agent, or Firm* — Jefferson IP Law, LLP

(57) ABSTRACT

A method for generating a key hierarchy by a MS in a wireless network is provided. The method includes transmitting an authentication request message to a new BS, receiving an authentication response message as a response message to the authentication request message from the new BS, determining whether to perform a full authentication operation with a H3A server based on the authentication response message, performing the full authentication operation or a crypto-handshake operation with the H3A server based on the determining result, after performing the full authentication operation or the crypto-handshake operation, determining whether a first expected signature value received from the new BS is identical to a first expected signature value calculated by the MS, and if the first expected signature value received from the new BS is equal to a first expected signature value calculated by the MS, determining that an authentication for the new BS has succeeded.

29 Claims, 16 Drawing Sheets

(51) Int. Cl.
   *H04M 1/66* (2006.01)
   *H04W 12/04* (2009.01)
   *H04W 12/02* (2009.01)
   H04L 29/06 (2006.01)
   H04W 12/06 (2009.01)
   H04W 12/12 (2009.01)

(58) Field of Classification Search
   USPC ................. 380/270; 726/4; 455/410, 411
   See application file for complete search history.

(56) References Cited

U.S. PATENT DOCUMENTS

| | | | |
|---|---|---|---|
| 2007/0154016 A1* | 7/2007 | Nakhjiri | H04L 63/06 380/270 |
| 2008/0298595 A1 | 12/2008 | Narayanan et al. | |
| 2011/0010538 A1 | 1/2011 | Falk et al. | |
| 2011/0129088 A1 | 6/2011 | Lee et al. | |
| 2012/0204027 A1 | 8/2012 | Baek et al. | |
| 2014/0156742 A1* | 6/2014 | Liu | H04L 67/42 709/203 |
| 2014/0281529 A1* | 9/2014 | Epp | H04L 63/061 713/168 |

FOREIGN PATENT DOCUMENTS

| | | |
|---|---|---|
| KR | 10-0728260 B1 | 6/2007 |
| KR | 10-2010-0042738 A | 4/2010 |
| KR | 1020110061440 A | 6/2011 |
| KR | 1020120091635 A | 8/2012 |

* cited by examiner

APPARATUS AND METHOD FOR GENERATING KEY HIERARCHY IN WIRELESS NETWORK

CROSS-REFERENCE TO RELATED APPLICATION(S)

This application claims the benefit under 35 U.S.C. §119(a) of a Korean patent application filed on Apr. 16, 2013 in the Korean Intellectual Property Office and assigned Serial number 10-2013-0041525, the entire disclosure of which is incorporated herein by reference.

TECHNICAL FIELD

The present disclosure relates to an apparatus and method for generating a key hierarchy in a wireless network.

BACKGROUND

Security of wireless networks such as a $3r^d$ generation project partnership (3GPP) wireless network, a worldwide interoperability for microwave access (WiMAX) wireless network, and a 3rd generation project partnership 2 (3GPP2) wireless network may be acquired using cryptographic schemes.

A mobile station (MS) that attempts to attach to a network is required to perform a cryptographic mutual authentication procedure with the network. The MS and the network use their respective long-term credentials (e.g., a username-password pair, a X.509 certificate, a subscriber identity module (SIM) card, and/or the like) to perform the cryptographic mutual authentication procedure.

The long-term credentials are stored on the MS and a server located in a core network of an operator of the wireless network. Generally, servers which store the long-term credentials are known as an authentication, authorization, and accounting (3A) server. Furthermore, the 3A server that is located at a home network of the MS is known as a home authentication, authorization, and accounting (H3A) server. In the context of a home network, a network access authentication procedure is performed by the MS and the H3A server.

At an end of a successful wireless network access authentication procedure, the H3A server generates a session security context (e.g., a pair of an MS device identifier and an associated cryptographic session key), and transmits the session security context to a server which is located at an access network. The access network denotes a network that the MS attempts to access. The server located at the access network which receives the session security context is called a network access server (NAS). In contrast to the long-term credentials, the session security context is generally short-lived (e.g., 24 hours) and is used for deriving additional cryptographic keys for securing a data communication between the MS and the access network.

The NAS may be a dedicated server which serves a plurality of base stations (BSs) in a deployment, or the NAS may be co-located with each of or a subset of the plurality of BSs.

A network may include zero or more other 3A nodes such as a relay node and a proxy 3A node between the NAS and the H3A server. The 3A nodes operate as a conduit during the network access authentication procedure, and the 3A nodes also relay the session security context from the H3A server to the NAS at an end of a successful network access authentication. Nevertheless, in a wireless network according to the related art, the 3A nodes do not store or manipulate the session security context in any way.

A mutual authentication procedure between the MS and the H3A server may take a relatively long time. A messaging used in the mutual authentication procedure between the MS and the H3A server may incur two or more round-trips between end-points based on a used authentication scheme. For example, in an authentication key agreement (AKA)-based authentication scheme, two round-trips may be performed. In contrast, in a transport layer security (TLS)-based authentication scheme, even more than ten round-trips may be performed if large certificate chains are used. Each round-trip between MSs may vary between tens of milliseconds and hundreds of milliseconds based on a geographic separation between the end points. According to the related art, an intercontinental round-trip latency is generally 500 milliseconds. Overall, a mutual authentication procedure between an MS and an H3A server may take one second or more.

If the round trip latency is encountered only at time of an initial network entry, the round trip latency may be tolerated by a user of the MS. For example, a lengthy connection time after a user gets off an airplane, or after a power-on of an MS is usual. However, if the round trip latency is encountered during a handover from one BS to another BS, a disruption which the round trip latency may cause is problematic. For example, dropped voice calls or an interrupted video streaming may be a noticeable problem for users.

A NAS which serves a plurality of BSs may remedy some of the problems associated with round trip latency. For example, if the MS handovers from one BS to another BS under the same NAS, an MS-H3A authentication does not need to be repeated. For example, a session security context which is acquired by the NAS from the H3A server at an initial authentication may be used for generating a session security context to be used by the MS and a target BS if the MS attempts to handover to the target BS.

Nevertheless, problems resulting from the round trip latency arise again if the MS crosses a border of the NAS and tries to attach to a BS served by another NAS. If the new NAS does not have any session security context stored prior to an arrival of the MS, a new MS-H3A authentication needs to be performed.

Furthermore, there are network architecture models according to which NAS functionality is co-located with the BS. For example, such network architecture models do not include a NAS that serves a plurality of BSs within the access network. Each NAS serves the co-located BS. In this case, each handover requires a new authentication through a new BS/NAS.

A 3A topology in a wireless network according to the related art will be described with reference to FIG. 1.

FIG. 1 schematically illustrates a 3A topology in a wireless network according to the related art.

Referring to FIG. 1, an area which is indicated with a dotted line denotes an access network 3A server (N3A) domain, and each N3A domain includes a plurality of BSs and one N3A.

Referring to FIG. 1, if an MS (not shown in FIG. 1) tries to attach to a BS2, the MS is authenticated. A signal related to an authentication for the MS traverses the BS2, an NA3#1 (N3A1), an N3A6, an N3A10, a visited network 3A server#1 (V3A1), and an H3A server. At an end of a successful access network authentication, only the H3A server and the BS2 hold a session security context. For example, none of intermediary nodes between the BS2 and the H3A server retain any security context. As a result, if the MS tries to attach to another BS in the same N3A area as the BS2, the MS needs to be re-authenticated. A handover to other areas such as a handover to an area of a BS6 also requires a new authentication.

Cryptographic keys used for a session security context form a key hierarchy. In this point, if an old key has been used in derivation of a letter key, the old key is a parent of another key. Here, consider a key that is shared between the MS and the H3A server. A key which is shared between the MS and the H3A server may be a key of long-term credentials, or a session key which is generated at an end of a successful authentication (e.g., a master session key (MSK), or an extended master session key (EMSK) of an extensible authentication protocol (EAP)).

A 3A topology in a wireless network according to the related art has been described with reference to FIG. 1, and a legacy key hierarchy structure in a wireless network according to the related art will be described with reference to FIG. 2.

FIG. 2 schematically illustrates a legacy key hierarchy structure in a wireless network according to the related art.

Referring to FIG. 2, a key which is shared between an MS and an H3A server is expressed as "M". A key M.1 as a child key of the key which is shared between the MS and the H3A server M is derived using a one-way keyed hash function such as HMAC-SHA256. The H3A server provides the key M.1 to a NAS. Meanwhile, because the key M is also known to the MS, the MS may derive the key M.1. Accordingly, the key M.1 becomes a shared secret key between the MS and the NAS. If the NAS receives the key M.1, the NAS may generate a key M.1.1 as a child key of the key M.1, and provide the key M.1.1 to a given BS. The MS generates the same key (e.g., the key M.1.1) as the child key of the key M.1, and the key M.1.1 becomes a shared secret key between the MS and the BS. For example, a key hierarchy in FIG. 2 denotes a key hierarchy which is formed by the key M, the key M.1, and the key M.1.1.

A legacy key hierarchy according to which a depth of a hierarchy is a fixed value (3 in this case) is illustrated in FIG. 2. As described above, 3A nodes between the H3A server and the NAS do not perform a role in a related key hierarchy.

As a result, a key hierarchy has two levels if the NAS is co-located with the BS.

As described above, a case that an unnecessary authentication between an MS and an H3A server is performed may occur in a wireless network according to the related art, so the unnecessary authentication between the MS and the H3A server may result in unnecessary messaging. Further, the unnecessary messaging according to the unnecessary authentication between the MS and the H3A server results in unnecessary round trip latency, so a service quality of a radio network is decreased.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for generating a key hierarchy in a wireless network.

Another aspect of the present disclosure is to provide an apparatus and method for generating a key hierarchy in a wireless network thereby decreasing latency.

Another aspect of the present disclosure is to provide an apparatus and method for generating a key hierarchy in a wireless network thereby decreasing latency and holding an authentication performance.

Another aspect of the present disclosure is to provide an apparatus and method for generating a key hierarchy in a wireless network thereby removing a unnecessary authentication procedure.

Another aspect of the present disclosure is to provide an apparatus and method for generating a key hierarchy in a wireless network thereby decreasing latency and enhancing a service quality of a wireless network.

In accordance with an aspect of the present disclosure, a mobile station (MS) in a wireless network is provided. The MS includes a transmitter configured to transmit an authentication request message to a new base station (BS), a receiver configured to receive an authentication response message as a response message to the authentication request message from the new BS, and a controller configured to determine whether to perform a full authentication operation with a home authentication, authorization, and accounting (H3A) server based on the authentication response message, to perform the full authentication operation or a crypto-handshake operation with the H3A server based on the determining result, to determine whether a first expected signature value received from the new BS is equal to a first expected signature value calculated by the MS after performing the full authentication operation or the crypto-handshake operation, and to determine that an authentication for the new BS has succeeded if a first expected signature value received from the new BS is equal to the first expected signature value calculated by the MS.

In accordance with an aspect of the present disclosure, a BS in a wireless network is provided. The BS includes a receiver configured to receive an authentication request message from a MS, a controller configured to determine whether there is an unexpired session security context for the MS, and to generate a first expected signature value based on the determining result, and a transmitter configured to transmit the first expected signature value to the MS, wherein the controller determines whether a second expected signature value received from the MS is equal to a second expected signature value calculated by the BS, and allows an access to the MS if the second expected signature value received from the MS is equal to the second expected signature value calculated by the BS.

In accordance with an aspect of the present disclosure, an authentication, authorization, and accounting (3A) node in a wireless network is provided. The 3A node includes a receiver configured to receive an authentication request message from a BS or other 3A node, a controller configured to determine whether there is a unexpired session security context for a MS, and to generate a session security context for a child of the 3A node based on the determining result, and a transmitter configured to transmit the generated session security context to the child of the 3A node.

In accordance with an aspect of the present disclosure, a H3A server in a wireless network is provided. The H3A server includes a receiver configured to receive an authentication request message from a BS or other 3A node, a controller configured to determine whether there is a unexpired session security context for a MS, and to generate a session security context for a child of the 3A node based on the determining result, and a transmitter configured to transmit the generated session security context to the child of the 3A node.

In accordance with another aspect of the present disclosure, a method for generating a key hierarchy by a MS in a wireless network is provided. The method includes transmitting an authentication request message to a new BS, receiving an authentication response message as a response message to the authentication request message from the new BS, determining whether to perform a full authentication operation with a H3A server based on the authentication response message, performing the full authentication operation or a crypto-handshake operation with the H3A server based on the determining result, after performing the full authentication operation or the crypto-handshake operation, determining whether a first expected signature value received from the new BS is identical to a first expected signature value calculated by the MS, and if the first expected signature value received from the new BS is equal to a first expected signature value calculated by the MS, then determining that an authentication for the new BS has succeeded.

In accordance with another aspect of the present disclosure, a method for generating a key hierarchy by a BS in a wireless network is provided. The method includes receiving an authentication request message from a MS, determining whether there is an unexpired session security context for the MS, generating a first expected signature value based on the determining result and transmitting the first expected signature value to the MS, determining whether a second expected signature value received from the MS is equal to a second expected signature value calculated by the BS, and if the second expected signature value received from the MS is equal to the second expected signature value calculated by the BS, then allowing an access to the MS.

In accordance with another aspect of the present disclosure, a method for generating a key hierarchy by an 3A node in a wireless network is provided. The method includes receiving an authentication request message from a BS or other 3A node, determining whether there is an unexpired session security context for a MS, generating a session security context for a child of the 3A node based on the determining result, and transmitting the generated session security context to the child of the 3A node.

In accordance with another aspect of the present disclosure, a method for generating a key hierarchy by a H3A server in a wireless network is provided. The method includes receiving an authentication request message from a BS or other 3A node, determining whether there is a unexpired session security context for a MS, generating a session security context for a child of the 3A node based on the determining result, and transmitting the generated session security context to the child of the 3A node.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
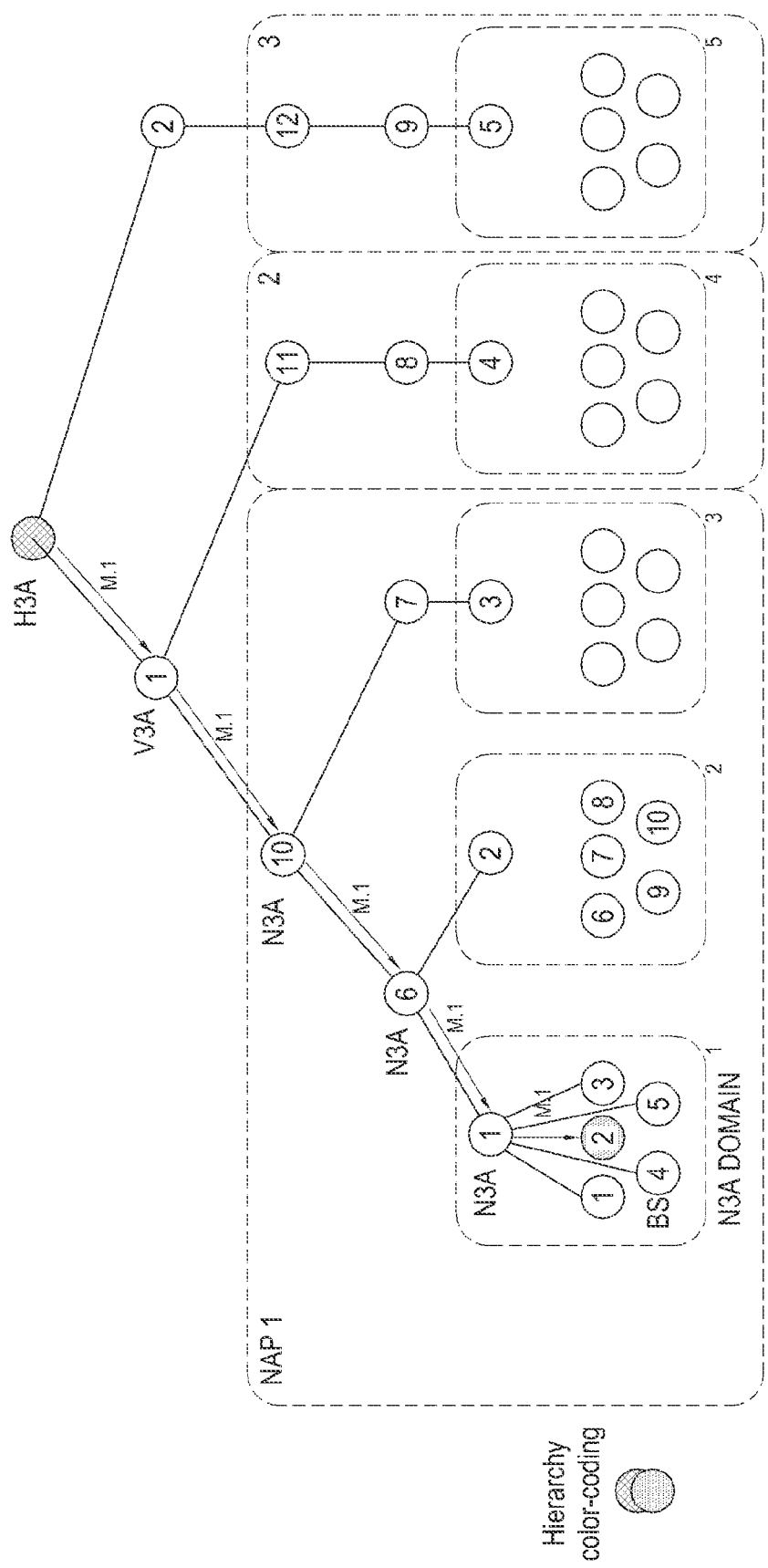
FIG. 1 schematically illustrates an authentication, authorization, and accounting (3A) topology in a wireless network according to the related art.
Figure 2:
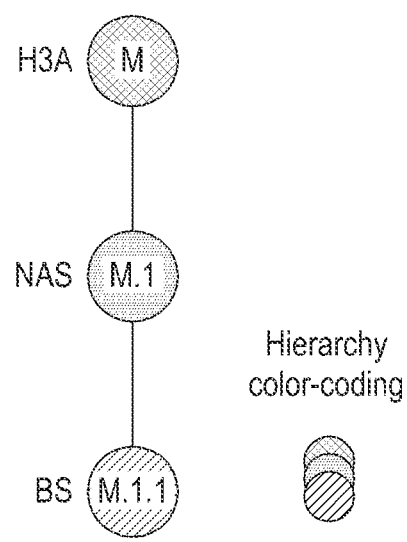
FIG. 2 schematically illustrates a legacy key hierarchy structure in a wireless network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a mobile station (MS) may be an electronic device.

Various embodiments of the present disclosure propose an apparatus and method for generating a key hierarchy in a wireless network.

Various embodiments of the present disclosure propose an apparatus and method for generating a key hierarchy in a wireless network thereby decreasing latency.

Various embodiments of the present disclosure propose an apparatus and method for generating a key hierarchy in a wireless network thereby decreasing latency and holding an authentication performance.

Various embodiment of the present disclosure propose an apparatus and method for generating a key hierarchy in a wireless network thereby removing a unnecessary authentication procedure.

Various embodiments of the present disclosure propose an apparatus and method for generating a key hierarchy in a wireless network thereby decreasing latency and enhancing a service quality of the wireless network.

A method and apparatus according to various embodiments of the present disclosure may be applied to various communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3r^d$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile interne protocol (Mobile IP) system, and/or the like.

Firstly, in an initial authentication, any one of authentication, authorization, and accounting (3A) nodes between a base station (BS) and a home authentication, authorization, and accounting (H3A) server may be a part of a key hierarchy. The 3A nodes between the BS and the H3A server may indicate that the 3A nodes between the BS and the H3A server are to be a part of the key hierarchy by including identifiers (IDs) of the 3A nodes between the BS and the H3A server into an initial authentication request message which traverses the 3A nodes between the BS and the H3A server towards the H3A server. Each upstream 3A node may determine whether to add each upstream 3A node to the key hierarchy, and whether to desire to remove a part of downstream 3A nodes from the key hierarchy. The determining operation in each upstream 3A node is based on a policy of each upstream 3A node. The H3A server receives the initial authentication request message, and may determine whether to remove a part of the 3A nodes from a key hierarchy which will be formed. If the key hierarchy is dynamically determined, an authentication procedure occurs. At end of a successful wireless network authentication, each of the nodes included in the key hierarchy which is dynamically formed acquires a dedicated session security context for the MS.

A key hierarchy in a wireless network according to an embodiment of the present disclosure will be described with reference to FIG. 3.

Figure 3:
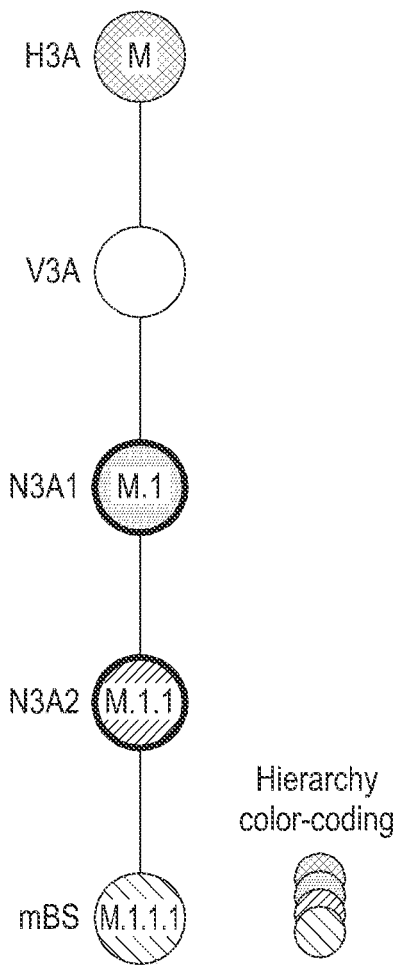
FIG. 3 schematically illustrates a key hierarchy in a wireless network according to an embodiment of the present disclosure.

FIG. 3 schematically illustrates a key hierarchy in a wireless network according to an embodiment of the present disclosure.

Referring to FIG. 3, an example of a key hierarchy which is formed if an access network 3A server (N3A) #1(N3A1) and an N3A #2 (N3A2) are selected as a part of a key hierarchy and approved by upstream 3A nodes (e.g., a visited network 3A server: (V3A) and an H3A server) is provided.

Each 3A node included in the key hierarchy acquires a session security context from a parent of each 3A node. The H3A server generates the session security context as a result of a successful network access authentication. For example, if an extensible authentication protocol (EAP) scheme is used, the session security context (including a secret key M) which is held by the H3A server is based on a master session key (MSK) and an extended master session key (EMSK) of the EAP scheme. An N3A1 as the next child included in the key hierarchy acquires other key M.1 as a child of a key M. An N3A2 acquires a key M.1.1 as a child of a key M.1. According to various embodiments of the present disclosure, a BS (e.g., an mBS) acquires a key M.1.1.1 as a child of the key M.1.1.

The MS is notified about a list of IDs of 3A nodes in the dynamically-formed key hierarchy. The MS may generate all of children keys (e.g., a key M.1, a key M.1.1, and a key M.1.1.1) because the MS knows the key M and uses one-way keyed hash functions for the child key generation.

A benefit associated with a key hierarchy of a wireless network according to an embodiment of the present disclosure as illustrated in FIG. 3 may be realized if the MS performs a handover.

A key hierarchy in a wireless network according to an embodiment of the present disclosure has been described with reference to FIG. 3, and a key hierarchy in a case that a handover is considered in a wireless network according to an embodiment of the present disclosure will be described with reference to FIG. 4.

Figure 4:
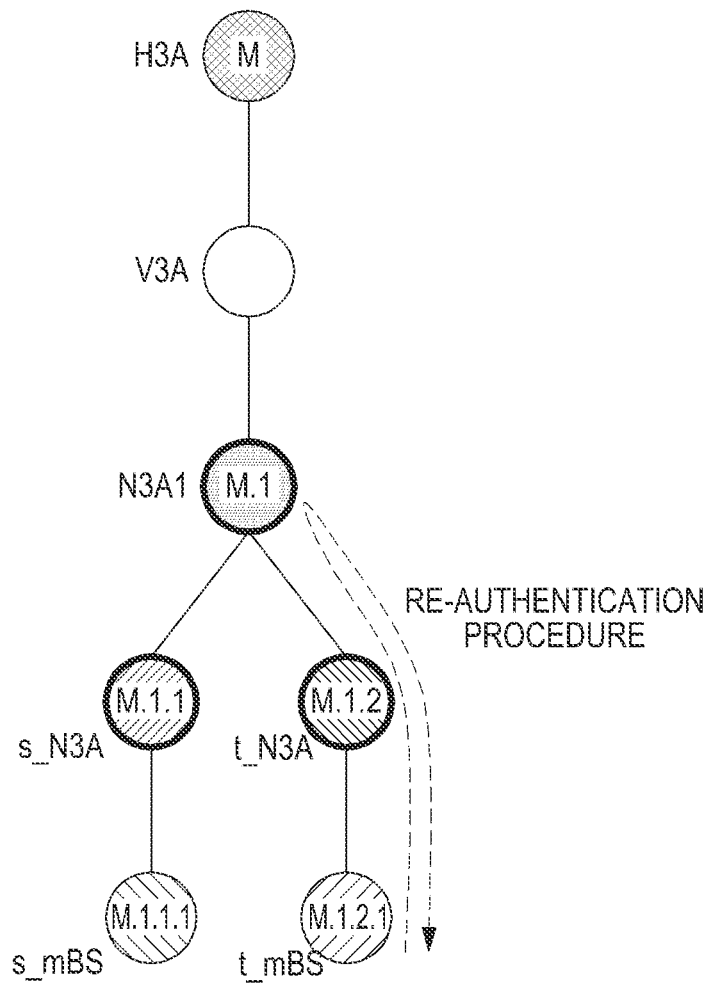
FIG. 4 schematically illustrates a key hierarchy in a case that a handover is considered in a wireless network according to an embodiment of the present disclosure.

FIG. 4 schematically illustrates a key hierarchy in a case that a handover is considered in a wireless network according to an embodiment of the present disclosure.

Referring to FIG. 4, if an MS (not shown in FIG. 4) accesses a BS1, the MS performs an access authentication procedure in which the MS transfers a session security context to an N3A1, an N3A2, and the BS1. If the MS tries to access the BS1, re-authentication for the MS is necessary. In this case, the authentication for the MS is not related to an H3A server. Because the N3A1 has already stored a session security context, the MS may be authenticated using the session security context which has been stored in the N3A1. A session security context used in an N3A3 (uses a key M.1.2) is generated from the session security context used in the N3A1 (uses a key M.1), and a session security context used in a BS2(uses a key M.1.2.1) is generated from the session security context used in the N3A3 (uses the key M.1.2).

A key hierarchy in a case that a handover is considered in a wireless network according to an embodiment of the present disclosure has been described with reference to FIG. 4, and a network access authentication process of an MS in a wireless network according to an embodiment of the present disclosure will be described with reference to FIG. 5.

Figure 5:
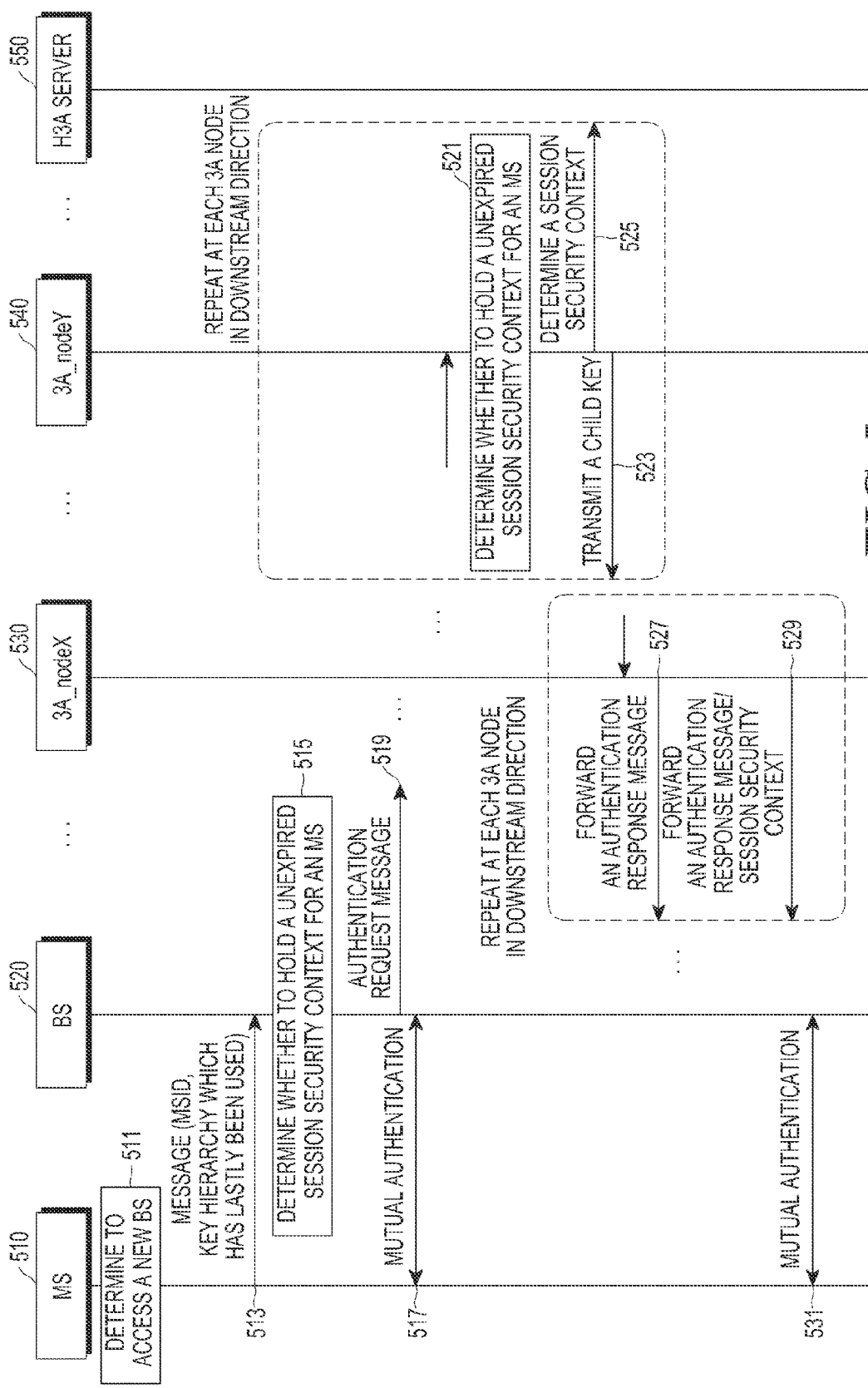
FIG. 5 schematically illustrates a network access authentication process of a mobile station (MS) in a wireless network according to an embodiment of the present disclosure.

FIG. 5 schematically illustrates a network access authentication process of an MS in a wireless network according to an embodiment of the present disclosure.

Referring to FIG. 5, at operation 511, an MS 510 determines whether to access to a new BS. If the MS 510 determines to access a new BS (e.g., a BS 520) at operation 511 (e.g., in response to the MS 510 determining to access a new BS), then the MS 510 proceeds to operation 513 at which the MS 510 transmits a message including a mobile station identifier (MSID) of the MS 510 and a key hierarchy which has lastly been used to the new BS (e.g., the BS 520). The key hierarchy is expressed in view of IDs of a BS and 3A nodes which are used for the key hierarchy. In contrast to the example illustrated in FIG. 5, if the MS 510 holds session security contexts which change key hierarchies and are unexpired, the MS 510 may transmit a plurality of key hierarchies using the same message. As a result, the session security contexts which are unexpired are valid session security contexts.

Upon receiving a message including an MSID of the MS 510 and a key hierarchy which has been lastly used (e.g., in response to receiving the message including the MSID of the MS 510 and a key hierarchy), the BS 520 determines whether to hold a unexpired session security context for the MS 510 at operation 515.

If the BS 520 determines to hold the unexpired session security context for the MS 510 at operation 515 (e.g., in response to the BS 520 determining to hold the unexpired session security context for the MS 510), then the BS 520 may authenticate the MS 510 without signaling which has other network elements such as intermediary 3A nodes, an H3A server, and/or the like. At operation 517, mutual authentication is performed between the MS 510 and the BS 520, and the key hierarchy is updated to include a base station identifier (BSID) of the BS 520.

If the BS 520 determines not to hold the unexpired session security context for the MS 510 at operation 515 (e.g., in response to the BS 520 determining not to hold the unexpired session security context for the MS 510), then the BS 520 proceeds to operation 519 at which the BS 520 transfers an authentication request message to the closest 3A node, and determines a session security context based on a key hierarchy received in the BS 520. If the BS 520 desires to be a part of the key hierarchy, the BS 520 indicates to the closest 3A node that the BS 520 desires to be the part of the key hierarchy using the authentication request message.

According to various embodiments of the present disclosure, operations 515,517 and 519) may be executed by each 3A node between the BS and the H3A server. In a case that a 3A node does not support an operation for various embodiments of the present disclosure, the 3A node may simply forward the authentication request message towards the H3A server if the 3A node normally operates.

At operation 521, an intermediary 3A node such as a 3A_node Y 540 determines whether to hold a unexpired session security context for the MS 510. If the 3A_node Y 540 determines to hold the unexpired session security context for the MS 510 (e.g., in response to the 3A_node Y 540 determining to hold the unexpired security context for the MS 510), the 3A_node Y 540 updates the key hierarchy, derives a key for a child in the new hierarchy, and transmits the child key to a child 3A node in the key hierarchy at operation 523.

If the 3A_node Y 540 determine not to hold the unexpired session security context for the MS 510 (e.g., in response to the 3A_node Y 540 determining not to hold the unexpired security context for the MS 510), the 3A_node Y 540 transfers an authentication request message to the closest 3A node and determines a session security context based on the received key hierarchy at operation 525. Upon desiring to be a part of the key hierarchy, the 3A_node Y 540 notifies to the closest 3A node that the 3A_node Y 540 desires to be the part of the key hierarchy using the authentication request message.

If a 3A_node X 530 as an intermediary 3A node receives an authentication response message which is transferred from upstream 3A nodes, the 3A_node X 530 determines whether the 3A_node X 530 is a part of a key hierarchy which is transferred using the received authentication response message. If the 3A_node X 530 determines that the 3A_node X 530 is not part of the key hierarchy (e.g., in response to the 3A_node X 530 determining that the 3A_node X 530 is not part of the key hierarchy), the 3A_node X 530 simply forwards the authentication response message towards the next 3A node included in the key hierarchy at operation 527.

If the 3A_node X 530 determines that the 3A_node X 530 is part of the key hierarchy (e.g., in response to the 3A_node X 530 determining that the 3A_node X 530 is part of the key hierarchy), the 3A_node X 530 stores the received session security context, generates other session security context (e.g., a child session security context) for a child 3A node included in the key hierarchy, and transmits the other session security context along with the authentication response message to the child 3A node at operation 529. A security key included in the child session security context is a child key of a security key included in a parent session security context.

If none of the intermediary 3A nodes holds the unexpired session security context for the MS 510, the authentication request message travels all paths to the H3A server 550. If the H3A server 550 holds the unexpired session security context for the MS 510, the H3A server 550 operates like any other 3A node as defined earlier. If no session security context is held, the H3A server 550 authenticates the MS 510 using the long-term credentials.

Whether the network access authentication procedure is processed by the BS 520 as at operation 517 or by some other intermediary 3A node or the H3A server 550, eventually, the MS 510 learns a new key hierarchy, derives a new key for the BS 520, and performs a mutual authentication procedure using the derived new key with the BS 520 at operation 531.

Although FIG. 5 illustrates a network access authentication process of an MS in a wireless network according to various embodiments of the present disclosure, various changes could be made to FIG. 5. For example, although shown as a series of operations, various operations in FIG. 5 could overlap, occur in parallel, occur in a different order, or occur multiple times.

A network access authentication process of an MS in a wireless network according to an embodiment of the present disclosure has been described with reference to FIG. 5, and an initial network access authentication process in a wireless network according to an embodiment of the present disclosure will be described with reference to FIG. 6.

Figure 6:
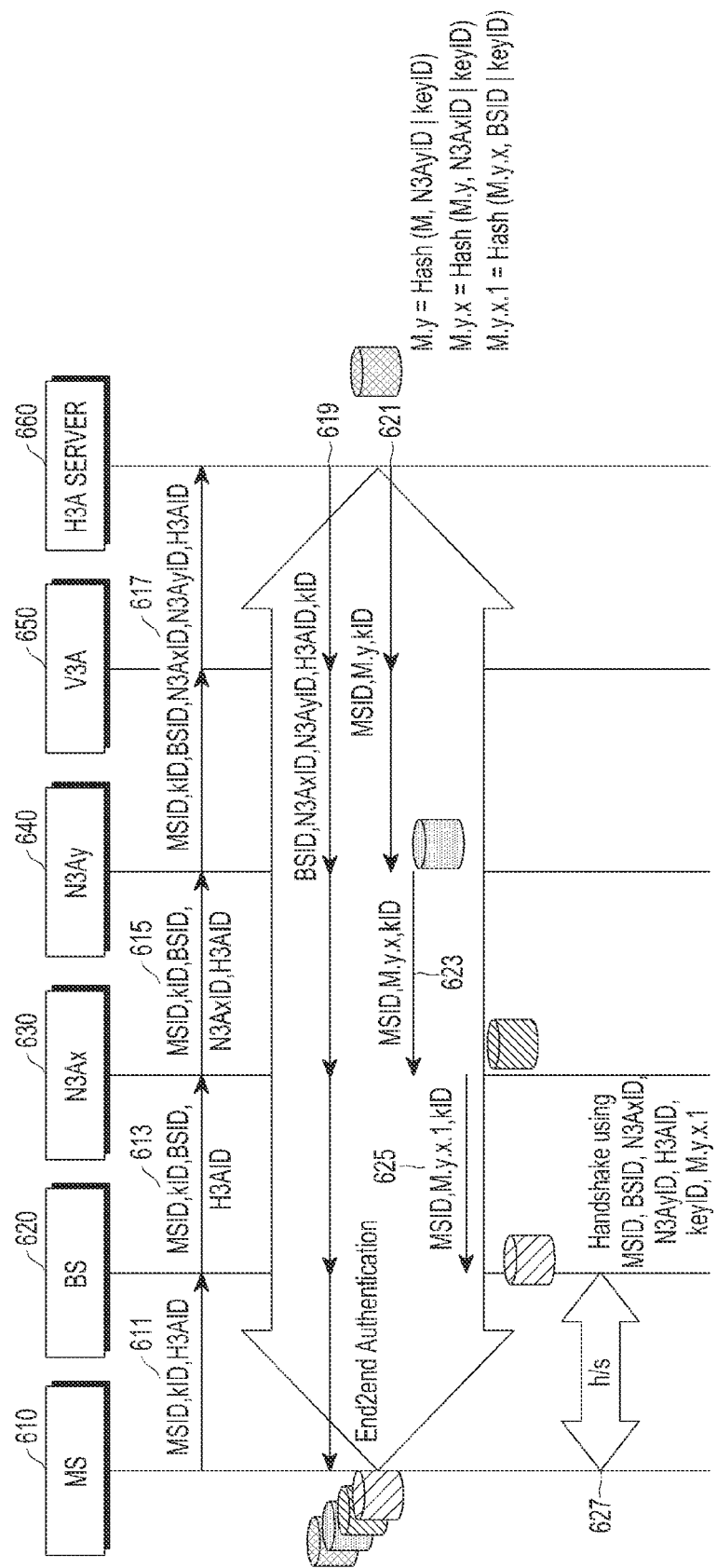
FIG. 6 schematically illustrates an initial network access authentication process in a wireless network according to an embodiment of the present disclosure.

FIG. 6 schematically illustrates an initial network access authentication process in a wireless network according to an embodiment of the present disclosure.

Referring to FIG. 6, the wireless network includes an MS 610, a BS 620, an N3Ax 630, an N3Ay 640, a V3A 650, and an H3A server 660.

An initial network access authentication process in FIG. 6 illustrates a signal flow for an MS 610 which performs an initial network access authentication process in which an N3Ax 630 and N3Ay 640 join a dynamically-formed key hierarchy.

Referring to FIG. 6, if the MS 610 is assumed to not have any key hierarchy at the time of performing an initial network access authentication process, at operation 611 an authentication request is communicated, and the authentication request message includes an MSID of the MS 610 and an H3A identifier (H3AID) of the H3A server 660. The authentication request message includes a key identifier (kID). The kID is changed each time a new session key is generated by the H3A server 660 and the MS 610 as a result of a new authentication operation between the H3A server 660 and the MS 610. The new authentication operation is based on a usage of long-term credentials. The kID for the initial network access authentication operation may include a well-known value such as 0.

Upon receiving the authentication request message, the BS 620 desires to be a part of the key hierarchy. As a result, at operation 613, the BS 620 includes a BSID of the BS 620 into the authentication request message as the BS 620 forwards the authentication request message to the H3A server 660. Similarly, both the N3Ax 630 and the N3Ay 640 desire to be a part of the key hierarchy. As a result, at operations 615 and 617, the N3Ax 630 and the N3Ay 640 respectively include IDs of the N3Ax 630 and the N3Ay 640 (e.g., an N3AxID and an N3AyID) into the authentication request message. If the V3A 650 is not interested in joining the key hierarchy, the V3A 650 forwards the authentication request message to the H3A server 660 without including an ID of the V3A 650 into the authentication request message.

The H3A server 660 enters an end-to-end authentication procedure with the MS 610 through the BS 620, the N3Ax 630, the N3Ay 640, and the V3A 650. The end-to-end authentication procedure is a procedure related to a plurality of round-trips for messaging among end-points. At operation 619, in one of messages included in the messaging, the H3A server 660 transmits a new key hierarchy.

Upon determining that the end-to-end authentication procedure is successful, the H3A server 660 generates a new kID and a session key for a child 3A node (N3Ay 640) of the H3A server 660. The H3A server 660 may generate a new kID by increasing the kID received from the MS 610. A session key for the child key M.y is derived from a session key M which is generated at an end of the successful end-to-end authentication procedure. A set of the session key, the key ID, and the MSID forms a session security context. At operation 621, the session security context is delivered to a child 3A node (e.g., the N3Ay 640).

Each child 3A stores a received session security context, generates a child session security context from the received session security context, and delivers the child session security context to a child of the child 3A. For example, at operation 623, the N3Ay 640 generates a session security context with a key M.y.x (e.g., a child of the key M.y), and transmits the session security context with the key M.y.x to the N3Ax 630. At operation 625, the N3Ax 630 generates a key M.y.x.1, and transmits the key M.y.x.1 to the BS 629. The operations 619 to 625 may be carried over the same message traversing intermediary nodes on a path from the H3A server 660 to the BS 620.

After receiving the session security context from the N3Ax 630, at operation 627, the BS 620 and the MS 610 perform a cryptographic handshake procedure. The cryptographic handshake procedure uses the MSID of the MS 610 and IDs of nodes included in the key hierarchy (e.g., a BSID, an N3AxID, an N3AyID, an H3AID), the kID, and a secret key M.y.x.1 which is shared between the MS 610 and the BS 620. The end-to-end authentication procedure is completed by completing the cryptographic handshake.

An initial network access authentication process in a wireless network according to an embodiment of the present disclosure has been described with reference to FIG. 6, and a 3A topology and a handover in a wireless network according to an embodiment of the present disclosure will be described with reference to FIG. 7.

Figure 7:
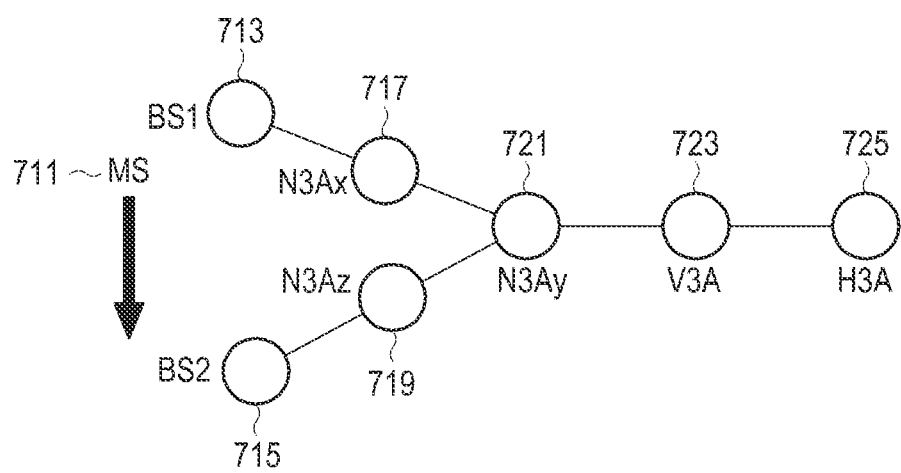
FIG. 7 schematically illustrates a 3A topology and a handover in a wireless network according to an embodiment of the present disclosure.

FIG. 7 schematically illustrates a 3A topology and a handover in a wireless network according to an embodiment of the present disclosure.

Referring to FIG. 7, a 3A topology and a handover if an MS 711 moves from a BS1 713 to a BS2 are illustrated. The 3A topology includes a BS1 713, a BS2 713, an N3Ax 717, an N3Az 719, an N3Ay 721, a V3A 723, and an H3A server 725.

A 3A topology and a handover in a wireless network according to an embodiment of the present disclosure has been described with reference to FIG. 7, and an authentication procedure performed in a case that a handover procedure in FIG. 7 is performed will be described with reference to FIG. 8.

Figure 8:
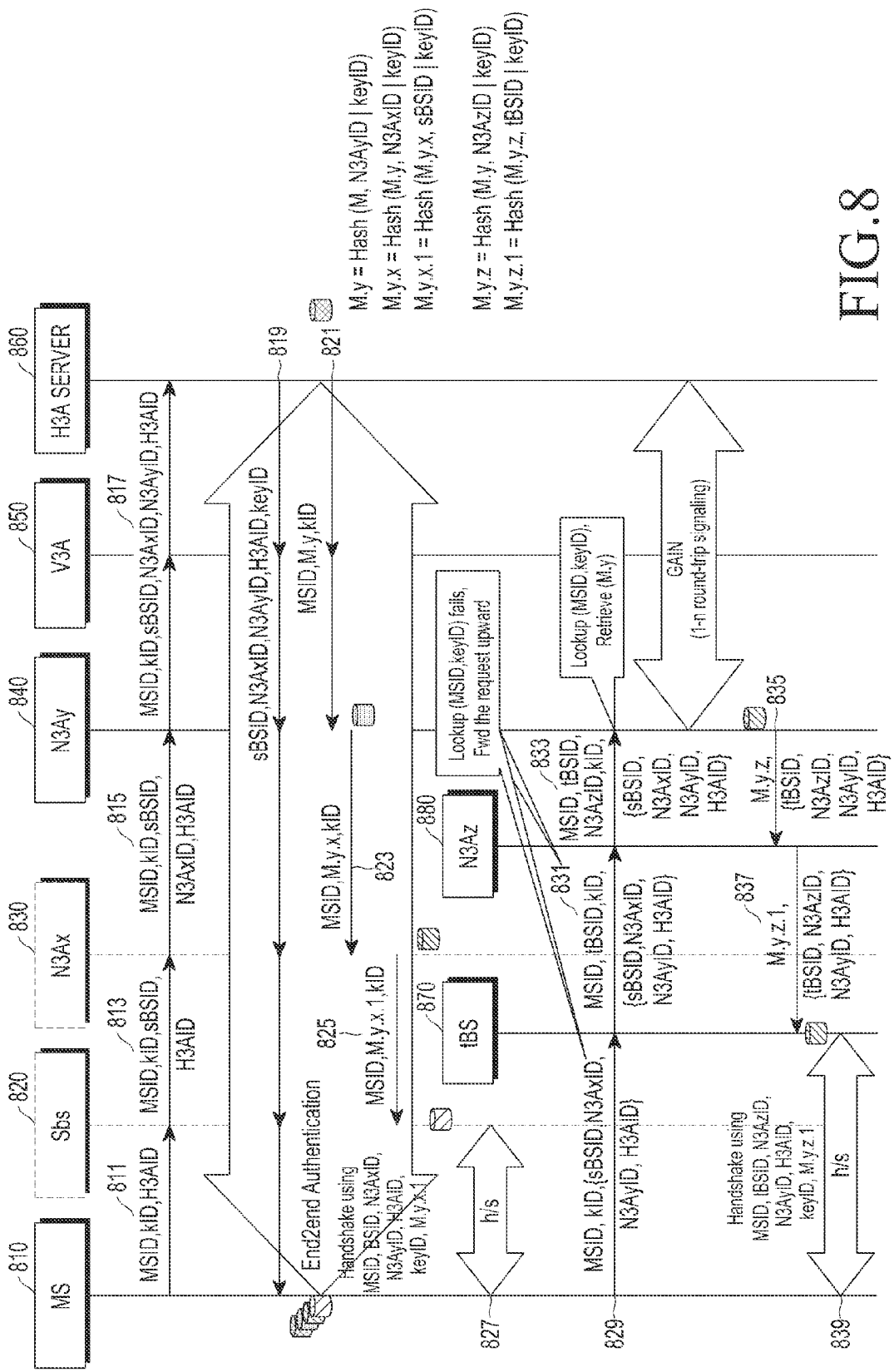
FIG. 8 schematically illustrates an authentication procedure performed in a case that a handover procedure such as, for example, the handover procedure illustrated in FIG. 7 is performed according to an embodiment of the present disclosure.

FIG. 8 schematically illustrates an authentication procedure performed in a case that a handover procedure such as, for example, the handover procedure illustrated in FIG. 7 is performed according an embodiment of the present disclosure.

Referring to FIG. 8, the wireless network includes an MS 810, a BS 820, an N3Ax 830, an N3Ay 840, a V3A 850, an H3A server 860, a BS2870, and an N3Ay 880.

Firstly, it will be noted that operations 811 to 827 in FIG. 8 are similar to operations 611 to 627 in FIG. 6, so a detailed description thereof will be omitted herein.

After operation 827, at an arbitrary timing point, the MS 810 determines whether to perform a handover procedure to the BS2870. The arbitrary timing point at which the MS 810 determines to perform the handover procedure to the BS2870 is illustrated as "T1" in FIG. 8.

At operation 829, the MS 810 initiates an authentication procedure by transmitting an MSID of the MS 810, a kID, and a current key hierarchy from the latest authentication to a new BS (e.g., the BS2870). The MSID, the kID, and {BS1ID, N3AxID, N3AyID, H3AID} are transmitted through an authentication request message. The BS2870 determines whether the BS2870 has an unexpired session key for a {MSID, kID} pair (e.g., a session security context).

If the BS2870 determines that the BS2870 does not have the session security context, then at operation 831, the BS2870 determines to forward the authentication request message towards the closest 3A node included in a current key hierarchy, and forward the authentication request message to the N3Az 880 as the closest 3A node. If the BS2870 desires to be a part of the key hierarchy, then the BS2 870 includes a BSID of the BS2870 into the authentication request message. The N3Az 880 as a receiving node performs the same operation in which the N3Az 880 determines whether to have the unexpired session key for the {MSID, kID} pair.

If the N3Az 880 does not have the unexpired session key for the {MSID, kID} pair, then at operation 833 the N3Az 880 also determines to forward the authentication request message to the N3Ay 840 as the closest 3A node included in the current key hierarchy, and forwards the authentication request message to the N3Ay 840. Because the N3Az 880 desires to be a part of the new key hierarchy, the N3Az 880 includes an N3AzID of the N3Az 880 into the authentication request message. Upon receiving the authentication request message and inspecting unexpired session security contexts, the N3Ay 840 recognizes that the N3Ay 840 matches the {MSID, kID} pair.

The N3Ay 840 uses a current key hierarchy {BSID1, N3AxID, N3AyID, H3AID} and a list of nodes between the MS 810 and the N3Ay 840 that desire to join the new key hierarchy {BS2ID, N3AzID}, and forms a new key hierarchy {BS2ID, N3AzID, N3AyID, H3AID}. The N3Ay 840 detects a stored key M.y which matches the {MSID, kID}. The N3Ay 840 generates a key M.y.z for the N3Az 880 as a child key from the key M.y. At operation 835, the generated session key and the new key hierarchy are transmitted towards the N3Az 880 as the child 3A node included in the new key hierarchy.

Upon receiving an authentication response message while determining whether the N3Az 880 is a part of the new hierarchy, the N3Az 880 stores the received session security context and generates a session security context for the BS2 870 as a child of the N3Az 880. A key M.y.z.1 is generated as a child key of a key M.y.z. At operation 837, the child security association and the new key hierarchy are transmitted to the BS2870.

Upon receiving the new key hierarchy and the session security context, the BS2870 performs a cryptographic handshake procedure with the MS 810. The MSID, the kID, the IDs of the nodes included in the new key hierarchy, and the key from the session security context are used in the cryptographic handshake procedure at operation 839. For example, the MSID, a BS2ID, an N3AzID, an N3AyID, an H3AID, the kID, and a key M.y.z.1 are used in the cryptographic handshake procedure.

An authentication procedure performed in a case that a handover procedure in FIG. 7 is performed has been described with reference to FIG. 8, and a relationship between a key hierarchy proposed in a wireless network according to an embodiment of the present disclosure and an old key hierarchy used in a wireless network according to the related art will be described with reference to FIG. 9.

Figure 9:
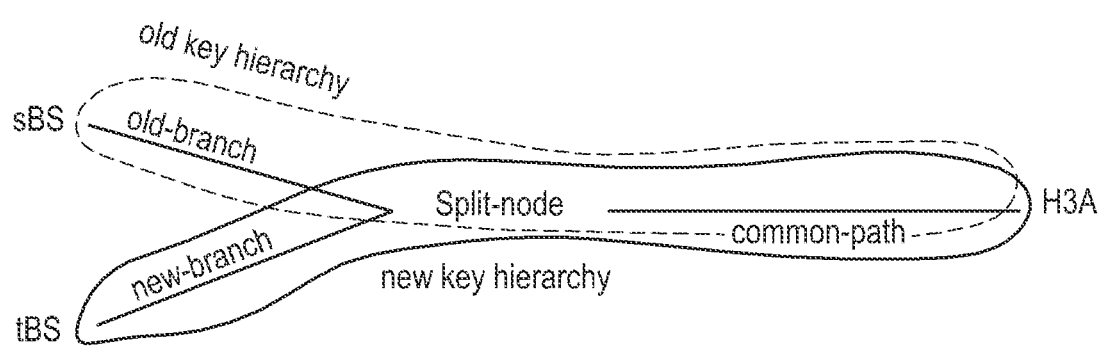
FIG. 9 schematically illustrates a relationship between a key hierarchy proposed in a wireless network according to an embodiment of the present disclosure and an old key hierarchy used in a wireless network according to the related art.

FIG. 9 schematically illustrates a relationship between a key hierarchy proposed in a wireless network according to an embodiment of the present disclosure and an old key hierarchy used in a wireless network according to the related art.

Referring to FIG. 9, in a wireless network according to the related art, an old key hierarchy includes an old BS (e.g., a serving BS (sBS)), an H3A server, and intermediary 3A nodes which are located between the sBS and the H3A server which are used for authenticating an MS. There may be no intermediary 3A node between the sBS and the H3A server. A new key hierarchy includes a target BS (tBS) as a new BS and intermediary 3A nodes which are located between the tBS and the H3A server which are used for authenticating the H3A server and the MS. There may be no intermediary 3A node between the tBS and the H3A server. Two hierarchies (e.g., the old key hierarchy and the new key hierarchy) may have a common part which is indicated as a part between a split-node and the H3A server in FIG. 9. In extreme cases, the split node may be identical to one of the BSs, or the H3A server. In all other cases, the split-node denotes a node which is located among the H3A server and the BSs.

A cipher handshake procedure between an MS and a tBS in a wireless network according to an embodiment of the present disclosure has been described with reference to FIG. 9, and a cipher handshake procedure between an MS and a tBS in a wireless network according to an embodiment of the present disclosure will be described with reference to FIG. 10.

Figure 10:
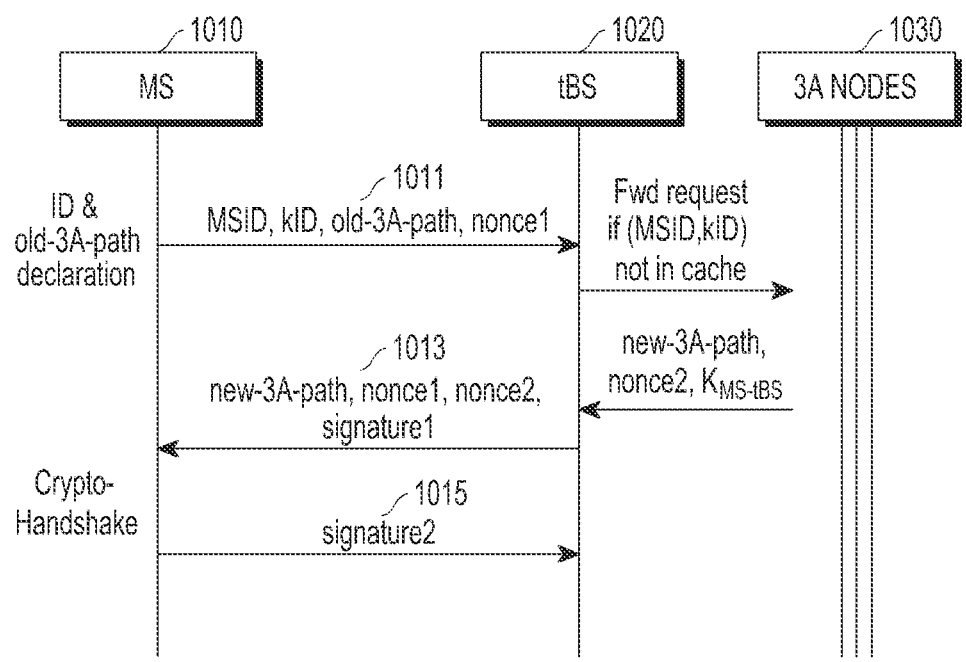
FIG. 10 schematically illustrates a cipher handshake procedure between an MS and a target base station (tBS) in a wireless network according to an embodiment of the present disclosure.

FIG. 10 schematically illustrates a cipher handshake procedure between an MS and a tBS in a wireless network according to an embodiment of the present disclosure.

Referring to FIG. 10, the wireless network includes an MS 1010, a tBS 1020, 3A nodes 1030, and a 3A server (not shown in FIG. 10).

A signal flow in FIG. 10 illustrates a signalling between the MS 1010 and the tBS 1020 as a new BS, especially illustrates a crypto handshake and signaling among the tBS 1020 and the 3A nodes 1030.

If the MS 1010 needs to be authenticated, the MS 1010 notifies an MSID of the MS 1010, a current kID, and a current (e.g., old) key hierarchy to the tBS 1020. At operation 1011, the MS 1010 transmits a message to the tBS 1020. The message transmitted from the MS 1010 to the tBS 1020 at operation 1011 includes the MSID, a kID that is received from an H3A server if the last new authentication is performed, an old key hierarchy in terms of IDs of nodes included in the key hierarchy, and a nonce value. The nonce is used for providing freshness to cryptographic computations. For example, the nonce may be a random, monotonically incremented, or some other kind of value. According to various embodiments of the present disclosure, it is assumed that the same nonce is not used with the same secret key value more than once. According to various embodiments of the present disclosure, any kind of value in compliance with this condition may be a nonce.

If the tBS 1020 does not store a session security context for a {MSID, kID} pair, the tBS 1020 needs to perform signaling with the 3A nodes 1030. If the tBS 1020 stores a session security context in a cache, or if the tBS 1020 receives the session security context from the 3A node 1030, then the tBS 1020 holds the session security context before entering the next operation. The new key hierarchy may have the last element, and a BS which is changed from the old key hierarchy, or more elements are changed.

If tBS 1020 receives a session security context from the 3A nodes 1030, a security key is computed based on a procedure #1.

<Procedure #1>

It is assumed that a secret key which is shared between the MS 1010 and the split-node is "$K_{split-MS}$". The split-node sets "$K_{self}$" to "$K_{split-MS}$", and generates a security key for a child of the split-node included in the new key hierarchy using the following Equation (1):

$$K_{child} = \text{hash}(K_{self}, \text{child node id}|\text{other parameters}) \quad \text{Equation (1)}$$

where, "hash" is a one-way keyed hash function (e.g., HMAC-SHA256), "$K_{self}$" is the secret key which is shared between the split-node and the MS 1010, "child node id" is an ID of a child node included in the new key hierarchy, "other parameters" is zero or more other parameters that may be included in Equation (1), and "|" denotes a concatenation operation.

Each node which receives $K_{child}$ from a parent node stores the $K_{child}$ as a key of each node (e.g., as a part of a session security context of each node), and generates a child key for a child node of each node using Equation (1) by generating "$K_{child}$" for each node included in the new key hierarchy.

Such a key derivation procedure is continued until the session security context reaches the tBS 1020 at a location at which a crypto handshake is performed at operations 1013 and 1015. At operation 1013, the tBS 1020 transmits a message to the MS 1010 using the session security context.

The message includes the new key hierarchy, so the MS 1010 knows the new key hierarchy. The message includes a nonce value (nonce1) which is originally transmitted by the MS 1010. The nonce value may be omitted. The message includes other nonce value (nonce2) which is received by the tBS 1020 from the 3A nodes 1030, or generated by the tBS 1020. Similar to other nonce values, the nonce2 may also be randomly generated, a monotonically incremented, or some other type. The message also includes a cryptographic signature which is used by the MS 1010 in order to authenticate the received message.

The cryptographic signature is calculated corresponding to Equation (2):

$$\text{Signature1} = \text{hash}(K_{MS-tBS}, \text{MSID}|\text{kID list of identifiers in new key hierarchy}|\text{nonce1}|\text{other parameters}) \quad \text{Equation (2)}$$

where, "hash" denotes a one-way keyed hash function, e.g., HMAC-SHA256, "$K_{MS-tBS}$" denotes a secret key which is shared between the MS 1010 and the tBS 1020, "MSID" denotes an MSID of the MS 1010, "kID" denotes a kID, "list of identifiers in new key hierarchy" denotes a list of IDs used in the new key hierarchy, "nonce1" denotes a nonce value generated by the MS 1010, "other parameters" denotes zero or other parameters which may be included in Equation (2), and "|" denotes a concatenation operation.

The nonce2 may be used in Equation (3).

$$\text{Signature1} = \text{hash}(K_{MS-tBS}, \text{MSID}|\text{kID list of identifiers in new key hierarchy}|\text{nonce1}|\text{nonce2}|\text{other parameters}) \quad \text{Equation (3)}$$

Upon receiving the message, the MS 1010 determines whether the received nonce 1 is equal to the transmitted nonce 1. If the received nonce 1 is different from the transmitted nonce 1, the MS 1010 discards the received message. Unlike the above, if the MS 1010 does not check the nonce 1, the nonce 1 may not be included in the message.

The MS 1010 may detect the new key hierarchy from the message. The MS 1010 may need to derive a secret key which is shared between the MS 1010 and a BS (e.g., the tBS 1020). In order to derive the secret key which is shared between the MS 1010 and the tBS 1020, the MS 1010 performs, with the H3A server, the first procedure which starts from the secret session key which is shared between the H3A server and the MS 1010 and implements an equation for each 3A node 1030 which is in the new key hierarchy and the tBS 1020.

The MS 1010 stops an operation which derives the secret key which is shared between the MS 1010 and the tBS 1020. In order to calculate a value of the MS 1010 for a signature 1, the MS 1010 uses the secret key which is shared between the MS 1010 and the tBS 1020 and Equation (2). The network is authenticated if the calculated signature value is equal to the received signature value. If the calculated signature value is different from the received signature value, then the MS 1010 determines that the message is not authenticated and discards the message.

If the network is authenticated, then the MS 1010 transmits other message different from the message including other signature to the tBS 1020 at operation 1015. The other message may include nonce 1 and/or nonce 2. The signature (e.g., signature 2) is calculated corresponding to Equation (4):

$$\text{Signature2} = \text{hash}(K_{MS\text{-}tBS}, \text{MSID}|\text{kID list of identifiers in new key hierarchy}|\text{nonce2}|\text{other parameters}) \qquad \text{Equation (4)}$$

where, "hash" is a one-way keyed hash function (e.g., HMAC-SHA256), "$K_{MS\text{-}tBS}$" is the secret key which is shared between the MS 1010 and a new BS (e.g., the tBS 1020), "MSID" denotes an MSID of the MS 1010, "kID" denotes a key ID, "list of identifiers in new key hierarchy" denotes a list of IDs used in the new key hierarchy, "nonce2" denotes a nonce value which is generated by the tBS 1020 or the 3A node 1030, "other parameters" is zero or more other parameters that may be included in Equation (4), and "|" denotes a concatenation operation.

The nonce1 may be used in Equation (5):

$$\text{Signature2} = \text{hash}(K_{MS\text{-}tBS}, \text{MSID}|\text{kID list of identifiers in new key hierarchy}|\text{nonce2}|\text{nonce1}|\text{other parameters}) \qquad \text{Equation (5)}$$

The tBS 1020 computes the signature2 using the same Equation with the $K_{MS\text{-}tBS}$ which is known to tBS 1020. If the computed signature2 value is equal to the received signature2 value, then the tBS 1020 determines that the MS 1010 is authenticated. If the computed signature2 value is different from the received signature2 value, then the tBS 1020 determines that the received message is not authenticated, and discards the message.

One additional optimization is performed if the 3A nodes 1030 attempt to select the shortest path to find another 3A node using a desired session security context. If the 3A nodes 1030 receiving an authentication request do not have an unexpired session security context for the MS 1010, then the 3A nodes 1030 need to determine where to forward the authentication request. The procedure for determining where to forward the authentication request is called a 3A routing. Possible targets are listed in old key hierarchy information which is carried using the authentication request. The 3A nodes 1030 may select any one of the listed IDs, and transmit the authentication request towards the identified 3A nodes 1030. In order to expedite the authentication procedure, the 3A nodes 1030 will select the closest 3A node in the list.

In order to detect which one of 3A nodes in the list is the closest, the 3A nodes 1030 may keep track of distances of the 3A nodes in the list. As a result, each time there is a signaling with another 3A node, round-trip latency may be recorded in a table. The 3A nodes 1030 may collect statistics in order to determine the closest 3A node if the 3A nodes 1030 intend to process the next authentication request. Optimum 3A routes may be found using the statistics. The 3A nodes 1030 refer to this table to retrieve a distance of each 3A node in the received old key hierarchy and select a 3A node with the shortest distance as the next hop for the authentication procedure.

Another additional optimization involves pushing a session security context towards parts of the network even before the MS 1010 reaches the network. For example, even though the MS 1010 is still connected to a BS1 in FIG. 10, one of the BS1 and an N3A2 may trigger, or the N3A1 may determine a child session security context for the N3A1 in order to generate a child session security context for an N3A3, and push the determined child session security context for the N3A1 to the N3A3. The N3A3 may determine to generate other child session security context and push the other child session security context to the BS2.

Accordingly, if the MS 1010 tries to access a BS2 in FIG. 4, then the session security context may be ready waiting on the BS2 in order to authenticate the MS without having a signalling with any other entity. Such a proactive push is enhanced if the network elements know neighbor network elements of the network elements. If the MS encounters a new BS, then such a proactive push scheme requires the MS to declare an old key hierarchy of the MS, so the BS and the 3A nodes may know which neighbor BS and 3A nodes are (which are listed in the old key hierarchy, as that indicates where the MS is input from). Such information (e.g., the old key hierarchy) may be collected over a time interval in order to know neighbor nodes of a BS and a 3A node, and the 3A node is used for determining what target 3A node and BS to push the context proactively.

Although FIG. 10 illustrates a cipher handshake procedure between an MS and a tBS in a wireless network according to an embodiment of the present disclosure, various changes could be made to FIG. 10. For example, although shown as a series of operations, various operations in FIG. 10 could overlap, occur in parallel, occur in a different order, or occur multiple times.

A cipher handshake procedure between an MS and a tBS in a wireless network according to an embodiment of the present disclosure has been described with reference to FIG. 10, and an operating process of an MS in a wireless network according to an embodiment of the present disclosure will be described with reference to FIG. 11.

Figure 11:
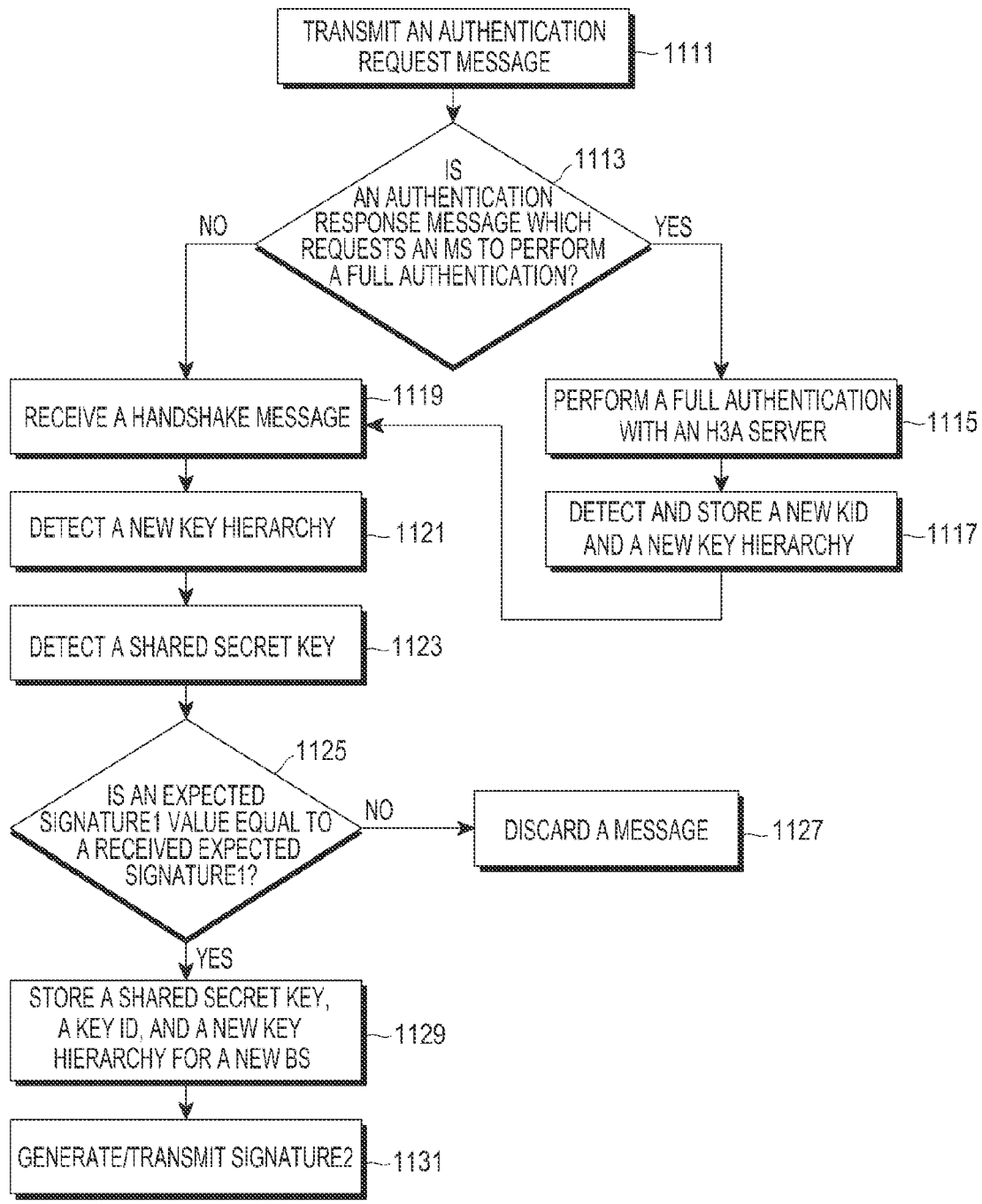
FIG. 11 schematically illustrates an operating process of an MS in a wireless network according to an embodiment of the present disclosure.

FIG. 11 schematically illustrates an operating process of an MS in a wireless network according to an embodiment of the present disclosure.

Referring to FIG. 11, upon determining to access a new BS, an MS needs to be firstly authenticated. Accordingly, at operation 1111, the MS transmits an authentication request message to the new BS. The authentication request message includes an MSID, a kID, an old key hierarchy, and nonce 1.

The MS receives an authentication response message in response to the authentication request message from the new BS. At operation 1113, the MS determines whether the received authentication response message is an authentication response message which requests the MS to perform a full authentication with an H3A server.

If the MS determines that the received authentication response message is the authentication response message which requests the MS to perform the full authentication with the H3A server at operation 1113, then the MS proceeds to operation 1115 at which the MS performs the full authentication with the H3A server.

Thereafter, at operation 1117, the MS detects and stores a new kID and a new key hierarchy at operation 1117. If the full authentication between the MS and the H3A server is necessary, then the MS performs the full authentication with the H3A server, so the MS knows the new key ID and the new key hierarchy as a result of the full authentication before proceeding to perform a crypto-handshake. The full authentication generates a root key of the key hierarchy (M). Thereafter, the MS proceeds to operation 1119.

In contrast, if the MS determines that the received authentication response message is not the authentication response message which requests the MS to perform the full authentication with the H3A server at operation 1113, then the MS proceeds to operation 1119 at which the MS receives a crypto-handshake message from the new BS.

At operation 1121, the MS detects a new key hierarchy from the crypto-handshake message received from the new BS.

At operation 1123, the MS detects a shared secret key for the new BS in order to compute an expected signature1 value.

At operation 1125, the MS determines whether the expected signature 1 value is equal to the received expected signature 1.

If the MS determines that the expected signature 1 value is different from the received expected signature 1 at operation 1125, then the MS proceeds to operation 1127 at which the MS determines that the received message is not authenticated, and discards the message.

If the MS determines that the expected signature 1 value is equal to the received expected signature 1 at operation 1125, then the MS proceeds to operation 1129 at which the MS determines that the received message is authenticated, and stores a shared secret key, a key ID, and a key hierarchy for the BS.

Thereafter, at operation 1131, the MS generates signature2, and transmits the signature2 to the BS. The signature2 will be used by the BS in order to authenticate the MS.

Although FIG. 11 illustrates an operating process of an MS in a wireless network according to an embodiment of the present disclosure, various changes could be made to FIG. 11. For example, although shown as a series of operations, various operations in FIG. 11 could overlap, occur in parallel, occur in a different order, or occur multiple times.

An operating process of an MS in a wireless network according to an embodiment of the present disclosure has been described with reference to FIG. 11, and an operating process of a BS in a wireless network according to an embodiment of the present disclosure will be described with reference to FIG. 12.

Figure 12:
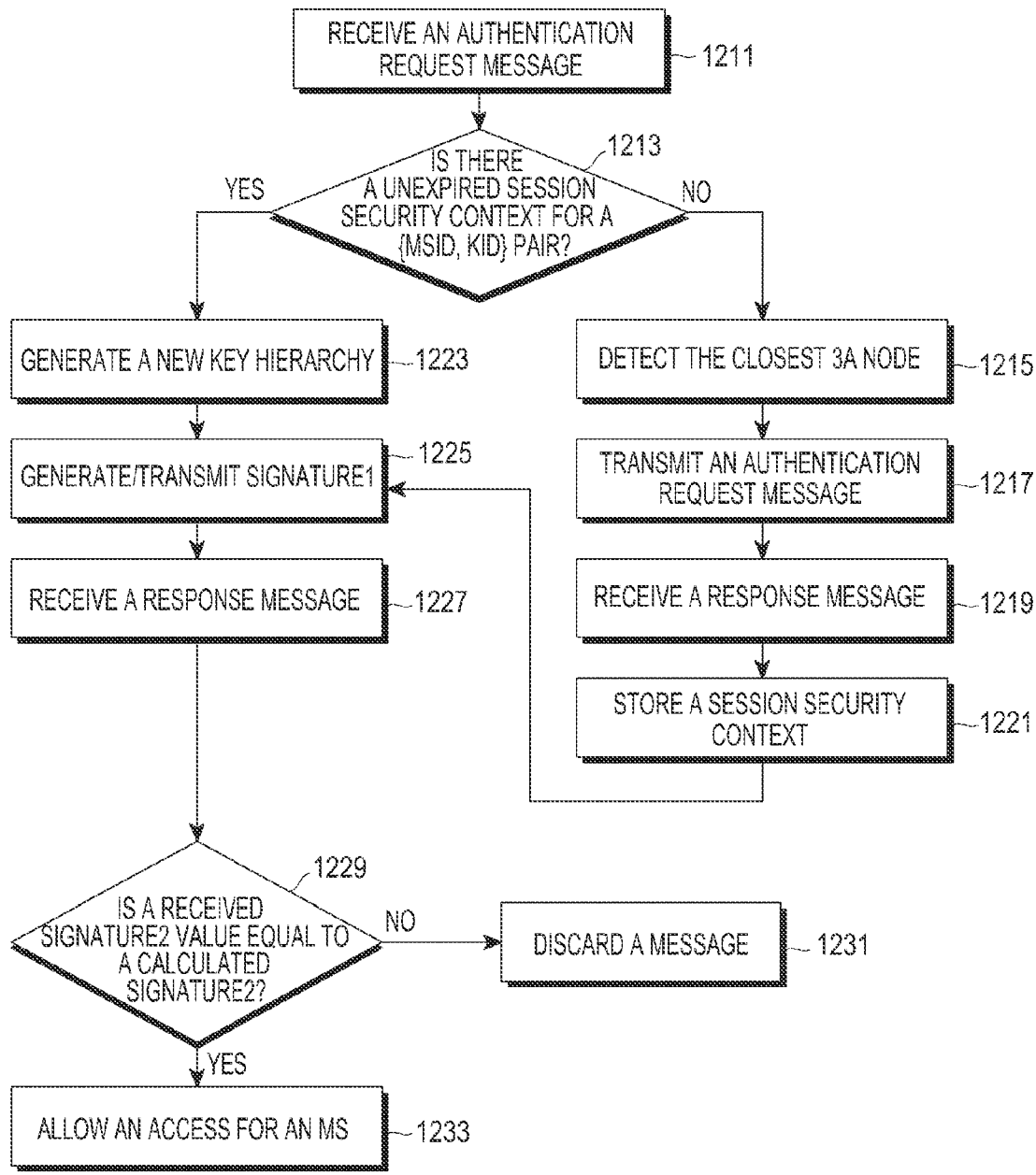
FIG. 12 schematically illustrates an operating process of a base station (BS) in a wireless network according to an embodiment of the present disclosure.

FIG. 12 schematically illustrates an operating process of a BS in a wireless network according to an embodiment of the present disclosure.

Referring to FIG. 12, at operation 1211, the BS receives an authentication request message from an MS. The authentication request message includes an MSID, a kID, an old hierarchy, and nonce1. According to various embodiments of the present disclosure, as illustrated in FIG. 12, an authentication process is performed if the BS receives the authentication request message from the MS. However, it will be understood by those of ordinary skill in the art that the BS may trigger a transmission of the authentication request message by the MS.

At operation 1213, the BS determines whether authentication request message received from the MS includes an unexpired session security context for a {MSID, kID} pair by inspecting a cache of the BS.

If the BS determines that the received authentication request message does not include unexpired session security context for the {MSID, kID} pair at operation 1213, then the BS proceeds to operation 1215 at which the BS detects the closest 3A node among 3A nodes which are listed in old key hierarchy information included in the received authentication request message. The BS detects the closest 3A node using information on 3A node distances which are collected from old interactions with the 3A nodes of the BS.

At operation 1217, the BS transmits the authentication request message to the detected closest 3A node. The BS may also indicate that the BS desires to become a part of the new key hierarchy using the authentication request message.

At operation 1219, the BS awaits and receives a response message to the authentication request message.

At operation 1221, the BS stores the received session security context (e.g., a new key hierarchy, a key ID, and a secret key shared between the BS and the MS) through the response message before transmitting signature 1 to the MS. Thereafter, the BS proceeds to operation 1225.

If the BS determines that the received authentication request message includes an unexpired session security context for the {MSID, kID} pair at operation 1213, then the BS proceeds to operation 1223 at which the BS generates the new key hierarchy by including the BS.

At operation 1225, the BS generates the signature 1 and transmits the generated signature1 to the MS.

At operation 1227, the BS detects signature2 by receiving a response message to the signature 1.

At operation 1229, the BS determines whether the received signature2 value is equal to the calculated signature2 value.

If the BS determines that the received signature2 value is different from the calculated signature2 value at operation 1229, then the BS proceeds to operation 1231 at which the BS determines that the message is not authenticated, and discards the message.

In contrast, if the BS determines that the received signature2 value is equal to the calculated signature2 value at operation 1223, then the BS proceeds to operation 1233 at which the BS determines that the message is valid and allows an access for the MS. The validity of the message denotes that the MS is authenticated and the MS is allowed to access the network.

Although FIG. 12 illustrates an operating process of a BS in a wireless network according to an embodiment of the present disclosure, various changes could be made to FIG. 12. For example, although shown as a series of operations, various operations in FIG. 12 could overlap, occur in parallel, occur in a different order, or occur multiple times.

An operating process of a BS in a wireless network according to an embodiment of the present disclosure has been described with reference to FIG. 12, and an operating process of a 3A node in a wireless network according to an embodiment of the present disclosure will be described with reference to FIG. 13.

Figure 13:
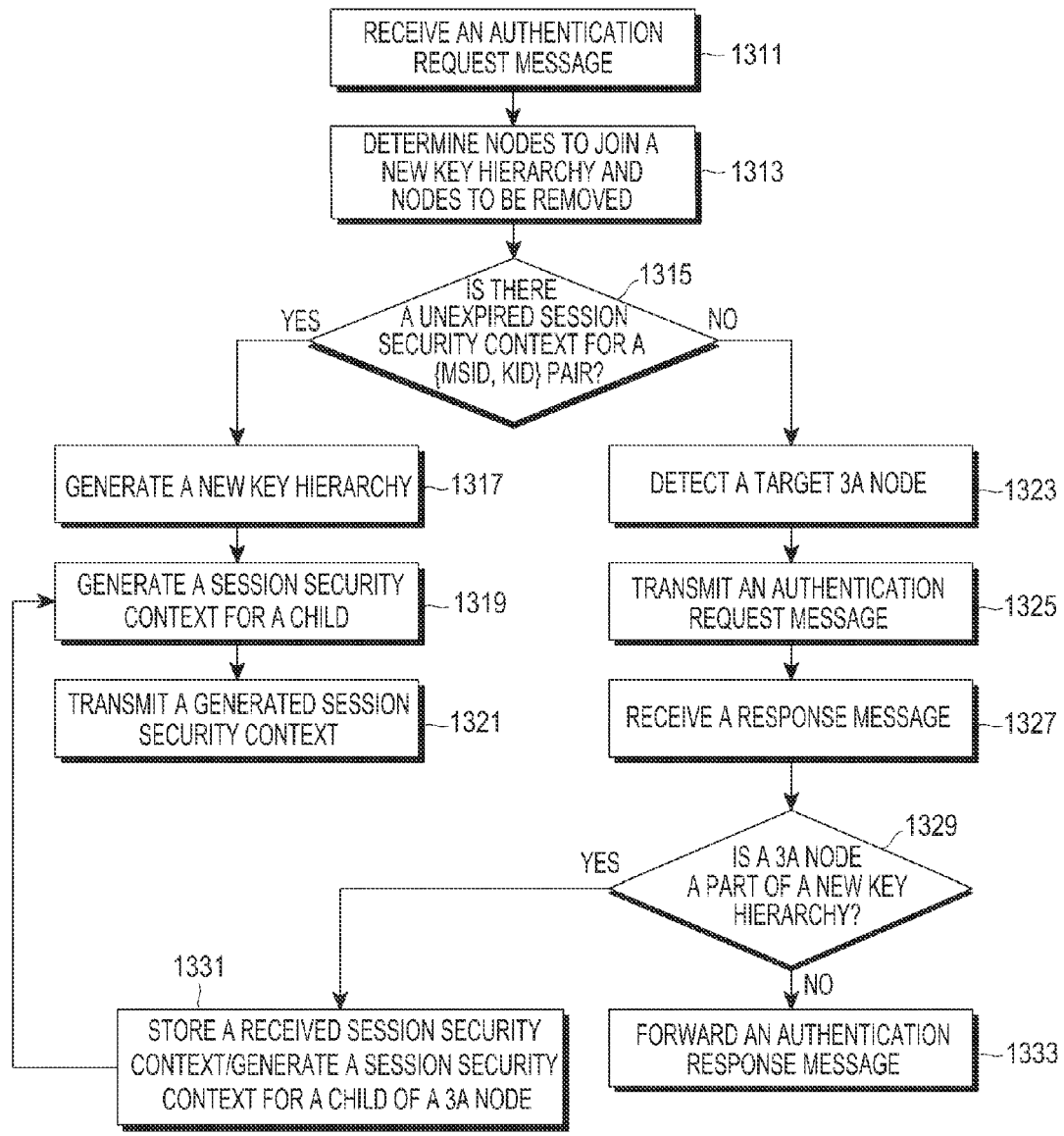
FIG. 13 schematically illustrates an operating process of a 3A node in a wireless network according to an embodiment of the present disclosure.

FIG. 13 schematically illustrates an operating process of a 3A node in a wireless network according to an embodiment of the present disclosure.

Prior to a description of FIG. 13, it will be noted that an operating process of a 3A node in FIG. 13 is an operating process of a 3A node except for an H3A server.

Referring to FIG. 13, at operation 1311, a 3A node receives an authentication request message from a BS or other 3A node.

At operation 1313, the 3A node determines which nodes desire to join a new key hierarchy, and determines which nodes to remove. If other 3A nodes desire to join the new key hierarchy, the 3A node is allowed to be added to the other 3A nodes.

At operation 1315, the 3A node determines whether the received authentication request message includes a session security context which is unexpired for a {MSID, kID} pair by inspecting a cache of the 3A node.

If the 3A node determines that the received authentication request message does not include the session security context which is unexpired for the {MSID, kID} pair at operation 1315, then the 3A node may proceed to operation 1323 at which the 3A node determines to forward the authentication request message to the closest 3A node. The 3A node determines a target 3A node by searching the closest 3A node among 3A nodes which are listed in old key hierarchy information included in the received authentication request message. The 3A node uses information on 3A node distances which are collected through old interaction with other 3A nodes of the 3A node.

Thereafter, at operation 1325, the 3A node transmits the authentication request message to the closest 3A node. If the 3A node desires to become a part of the new key hierarchy, the 3A node may indicate that the 3A node desires to become the part of the new key hierarchy in the authentication request message.

At operation 1327, the 3A node awaits and receives an authentication response message to the authentication request message.

At operation 1329, the 3A node determines whether the 3A node is the part of the new key hierarchy by inspecting a new key hierarchy included in the authentication response message.

If the 3A node determines that the 3A node is not part of the new key hierarchy at operation 1329, then the 3A node proceeds to operation 1333 at which the 3A node forwards the authentication response message to the BS.

If the 3A node determines that the 3A node is part of the new key hierarchy at operation 1329, then the 3A node proceeds to operation 1331 at which the 3A node stores the received session security context and proceeds to generate a session security context for a child of the 3A node. Thereafter, the 3A node may proceed to operation 1319.

If the 3A node determines that the received authentication request message includes a session security context which is unexpired for the {MSID, kID} pair at operation 1315, then the 3A node desires to become a part of the old key hierarchy and the new key hierarchy. Accordingly, the 3A node may proceed to operation 1317 at which the 3A node generates the new key hierarchy by considering a BS and other 3A nodes which are not deleted in the part of the new key hierarchy.

At operation 1319, the 3A node identifies the child of the 3A node in the new hierarchy and generates a session security context for the child of the 3A node.

At operation 1321, the 3A node transmits the newly generated session security context to the child node of the 3A node.

Although FIG. 13 illustrates an operating process of a 3A node in a wireless network according to an embodiment of the present disclosure, various changes could be made to FIG. 13. For example, although shown as a series of operations, various operations in FIG. 13 could overlap, occur in parallel, occur in a different order, or occur multiple times.

An operating process of a 3A node in a wireless network according to an embodiment of the present disclosure has been described with reference to FIG. 13, and an operating process of an H3A server in a wireless network according to an embodiment of the present disclosure will be described with reference to FIG. 14.

Figure 14:
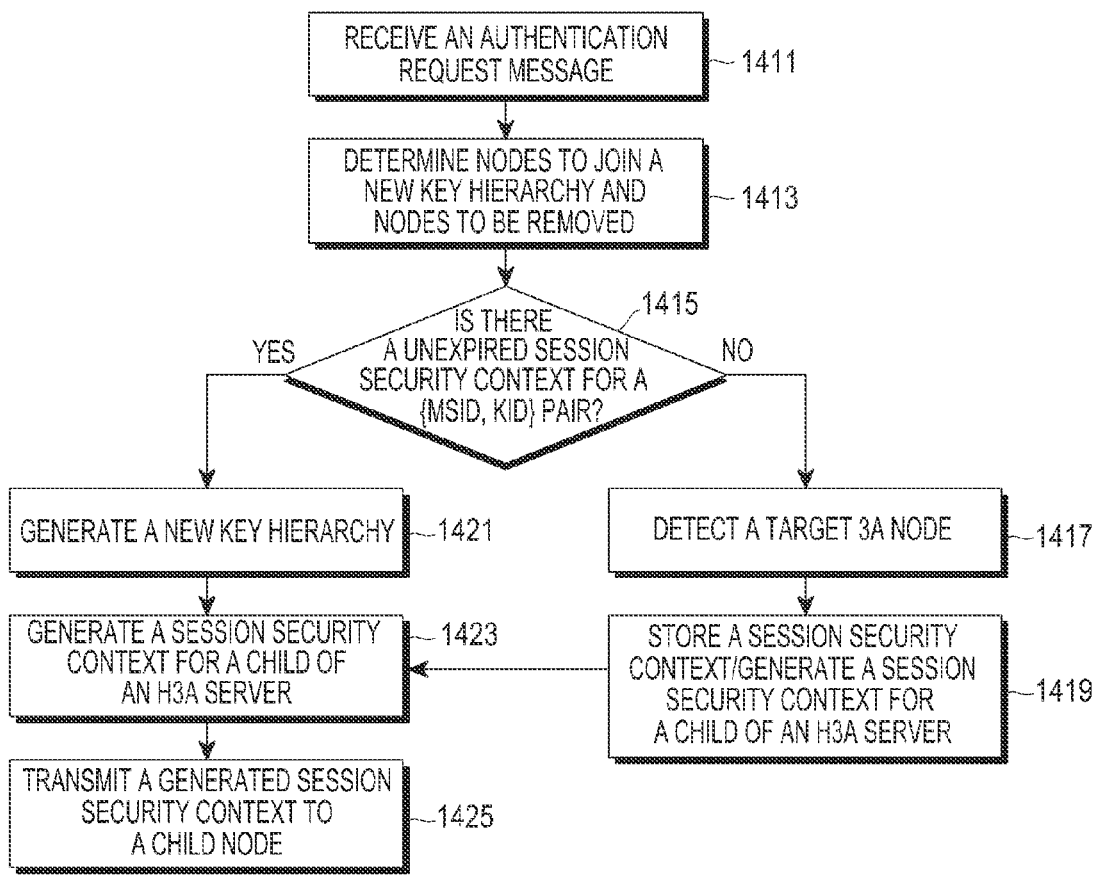
FIG. 14 schematically illustrates an operating process of a home authentication, authorization, and accounting (H3A) server in a wireless network according to an embodiment of the present disclosure.

FIG. 14 schematically illustrates an operating process of an H3A server in a wireless network according to an embodiment of the present disclosure.

Referring to FIG. 14, at operation 1411, an H3A server receives an authentication request message from a BS or other 3A node.

At operation 1413, the H3A server checks which nodes desire to join new key hierarchy, and determines to remove which nodes. If other 3A nodes desire to join the new key hierarchy, the H3A server is allowed to be added to the other 3A nodes.

At operation 1415, the H3A server determines whether the received authentication request message includes a session security context which is unexpired for a {MSID, kID} pair by inspecting a cache of the H3A server.

If the H3A server determines that the received authentication request message does not include the unexpired session security context for the {MSID, kID} pair at operation 1415, then the H3A server may proceed to operation 1417 at which the H3A server performs a full authentication operation.

After a successful authentication, at operation 1419, the H3A server stores the generated session security context, and generates a security context for a child of the H3A server. The H3A server generates a new key ID as a part of the full authentication, and stores the new key ID as a part of the security context. Thereafter, the H3A server may proceed to operation 1423.

If the H3A server determines that the received authentication request message includes an unexpired security context for the {MSID, kID} pair at operation 1415, then the H3A server may proceed to operation 1421 at which the H3A server generates the new key hierarchy by considering the old key hierarchy, and a BS and other 3A nodes which desire to be a part of the new key hierarchy.

At operation 1423, the H3A server identifies a child of the H3A server on the new hierarchy and generates a session security context of the child of the H3A server.

At operation 1425, the H3A server transmits the generated new session security context to the child node.

Although FIG. 14 illustrates an operating process of an H3A server in a wireless network according to an embodiment of the present disclosure, various changes could be made to FIG. 14. For example, although shown as a series of operations, various operations in FIG. 14 could overlap, occur in parallel, occur in a different order, or occur multiple times.

An operating process of an H3A server in a wireless network according to an embodiment of the present disclosure has been described with reference to FIG. 14, and an inner structure of an MS in a wireless network according to an embodiment of the present disclosure will be described with reference to FIG. 15.

Figure 15:
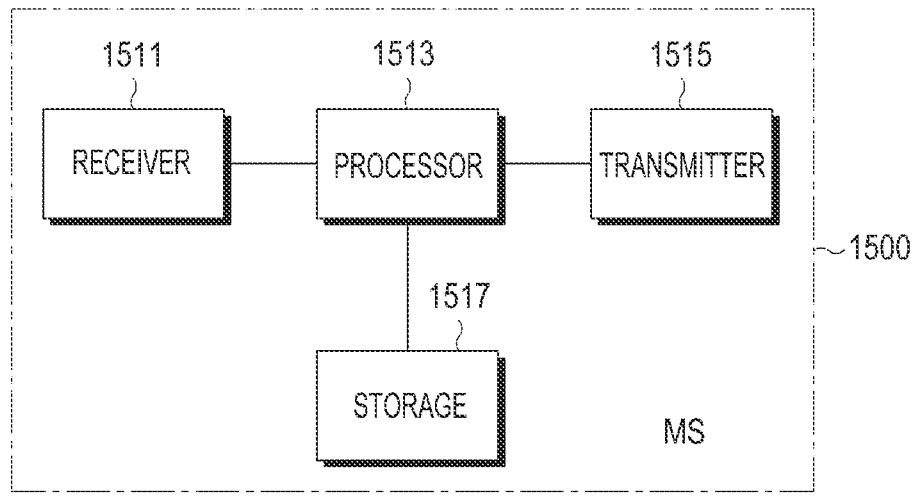
FIG. 15 schematically illustrates an inner structure of an MS in a wireless network according to an embodiment of the present disclosure.

FIG. 15 schematically illustrates an inner structure of an MS in a wireless network according to an embodiment of the present disclosure.

Referring to FIG. 15, an MS 1500 includes a receiver 1511, a controller 1513, a transmitter 1515, and a storage 1517.

The controller 1513 controls the overall operation of the MS 1500. More particularly, the controller 1513 controls the MS 1500 to perform an operation related to key hierarchy generation according to an embodiment of the present disclosure. The operation related to the key hierarchy generation is performed in the manner described with reference to FIGS. 3 to 14 and a description thereof will be omitted herein.

The receiver 1511 receives various signals, and the like from a BS, a 3A node, an H3A server, and the like under a control of the controller 1513. The various signals, and the like received in the receiver 1511 have been described in FIGS. 3 to 14 and a description thereof will be omitted herein.

The transmitter 1515 transmits various signals, and the like to a BS, a 3A node, an H3A server, and the like under a control of the controller 1513. The various signals, and the like transmitted in the transmitter 1515 have been described in FIGS. 3 to 14 and a description thereof will be omitted herein.

The storage 1517 stores the various signals, and the like received in the receiver 1511, and various data necessary for an operation of the MS 1500 (e.g., information related to a key hierarchy generating operation).

Although the receiver 1511, the controller 1513, the transmitter 1515, and the storage 1517 are shown in FIG. 15 as separate units, it is to be understood that this is merely for convenience of description. In other words, two or more of the receiver 1511, the controller 1513, the transmitter 1515, and the storage 1517 may be incorporated into a single unit.

An inner structure of an MS in a wireless network according to an embodiment of the present disclosure has been described with reference to FIG. 15, and an inner structure of a BS in a wireless network according to an embodiment of the present disclosure will be described with reference to FIG. 16.

Figure 16:
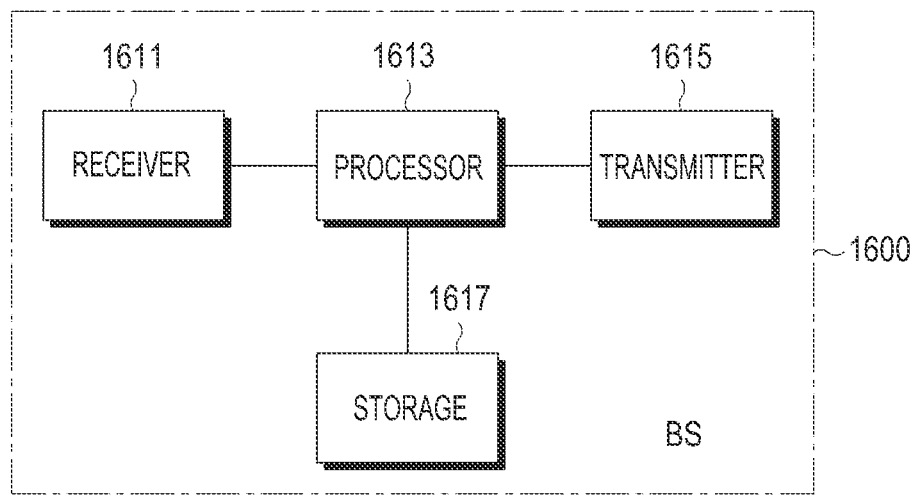
FIG. 16 schematically illustrates an inner structure of a BS in a wireless network according to an embodiment of the present disclosure.

FIG. 16 schematically illustrates an inner structure of a BS in a wireless network according to an embodiment of the present disclosure.

Referring to FIG. 16, a BS 1600 includes a receiver 1611, a controller 1613, a transmitter 1615, and a storage 1617.

The controller 1613 controls the overall operation of the BS 1600. More particularly, the controller 1613 controls the BS 1600 to perform an operation related to key hierarchy generation according to an embodiment of the present disclosure. The operation related to the key hierarchy generation is performed in the manner described with reference to FIGS. 3 to 14 and a description thereof will be omitted herein.

The receiver 1611 receives various signals, and the like from an MS, a 3A node, an H3A server, and the like under a control of the controller 1613. The various signals, and the like received in the receiver 1611 have been described in FIGS. 3 to 14 and a description thereof will be omitted herein.

The transmitter 1615 transmits various signals, and the like to an MS, a 3A node, an H3A server, and the like under a control of the controller 1613. The various signals, and the like transmitted in the transmitter 1615 have been described in FIGS. 3 to 14 and a description thereof will be omitted herein.

The storage 1617 stores the various signals, and the like received in the receiver 1611, and various data necessary for an operation of the BS 1600 (e.g., information related to a key hierarchy generating operation).

Although the receiver 1611, the controller 1613, the transmitter 1615, and the storage 1617 are shown in FIG. 16 as separate units, it is to be understood that this is merely for convenience of description. In other words, two or more of the receiver 1611, the controller 1613, the transmitter 1615, and the storage 1617 may be incorporated into a single unit.

An inner structure of a BS in a wireless network according to an embodiment of the present disclosure has been described with reference to FIG. 16, and an inner structure of a 3A node in a wireless network according to an embodiment of the present disclosure will be described with reference to FIG. 17.

Figure 17:
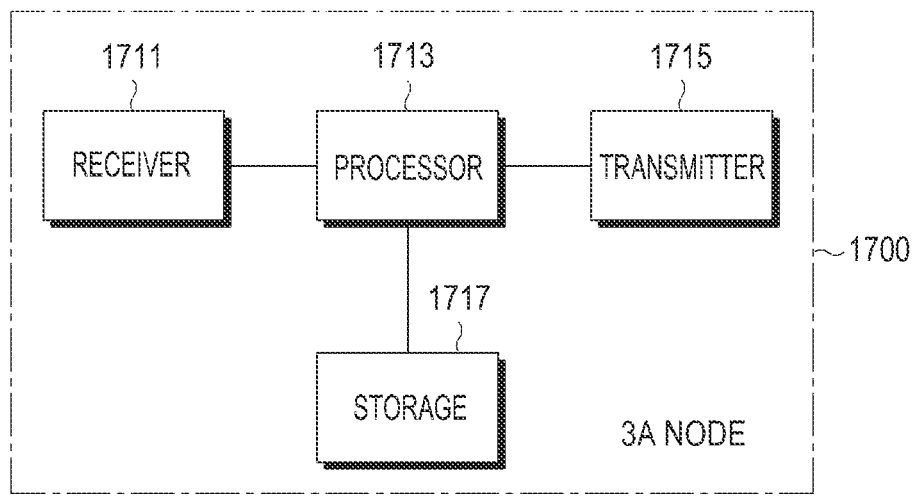
FIG. 17 schematically illustrates an inner structure of a 3A node in a wireless network according to an embodiment of the present disclosure.

FIG. 17 schematically illustrates an inner structure of a 3A node in a wireless network according to an embodiment of the present disclosure.

Referring to FIG. 17, a 3A node 1700 includes a receiver 1711, a controller 1713, a transmitter 1715, and a storage 1717.

The controller 1713 controls the overall operation of the 3A node 1700. More particularly, the controller 1713 controls the 3A node 1700 to perform an operation related to key hierarchy generation according to an embodiment of the present disclosure. The operation related to the key hierarchy generation is performed in the manner described with reference to FIGS. 3 to 14 and a description thereof will be omitted herein.

The receiver 1711 receives various signals, and the like from an MS, a BS, an H3A server, and the like under a control of the controller 1713. The various signals, and the like received in the receiver 1711 have been described in FIGS. 3 to 14 and a description thereof will be omitted herein.

The transmitter 1715 transmits various signals, and the like to an MS, a BS, an H3A server, and the like under a control of the controller 1713. The various signals, and the like transmitted in the transmitter 1715 have been described in FIGS. 3 to 14 and a description thereof will be omitted herein.

The storage 1717 stores the various signals, and the like received in the receiver 1711, and various data necessary for an operation of the 3A node 1700 (e.g., information related to a key hierarchy generating operation).

Although the receiver 1711, the controller 1713, the transmitter 1715, and the storage 1717 are shown in FIG. 17 as separate units, it is to be understood that this is merely for convenience of description. In other words, two or more of the receiver 1711, the controller 1713, the transmitter 1715, and the storage 1717 may be incorporated into a single unit.

An inner structure of a 3A node in a wireless network according to an embodiment of the present disclosure has been described with reference to FIG. 17, and an inner structure of an H3A server in a wireless network according to an embodiment of the present disclosure will be described with reference to FIG. 18.

Figure 18:
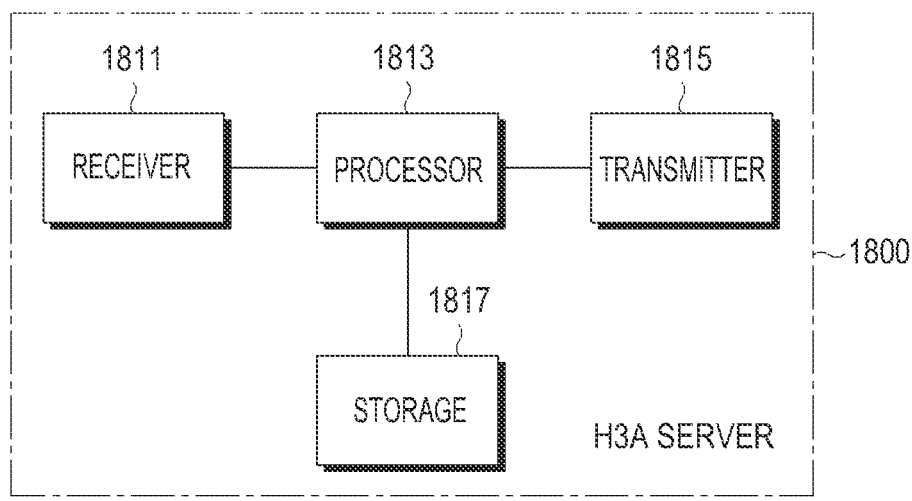
FIG. 18 schematically illustrates an inner structure of an H3A server in a wireless network according to an embodiment of the present disclosure.

FIG. 18 schematically illustrates an inner structure of an H3A server in a wireless network according to an embodiment of the present disclosure.

Referring to FIG. 18, an H3A server 1800 includes a receiver 1811, a controller 1813, a transmitter 1815, and a storage 1817.

The controller 1813 controls the overall operation of the H3A server 1800. More particularly, the controller 1813 controls the H3A server 1800 to perform an operation related to key hierarchy generation according to an embodiment of the present disclosure. The operation related to the key hierarchy generation is performed in the manner described with reference to FIGS. 3 to 14 and a description thereof will be omitted herein.

The receiver 1811 receives various signals, and the like from an MS, a BS, a 3A node, and the like under a control of the controller 1813. The various signals, and the like received in the receiver 1811 have been described in FIGS. 3 to 14 and a description thereof will be omitted herein.

The transmitter 1815 transmits various signals, and the like to an MS, a BS, a 3A node, and the like under a control of the controller 1813. The various signals, and the like transmitted in the transmitter 1815 have been described in FIGS. 3 to 14 and a description thereof will be omitted herein.

The storage 1817 stores the various signals, and the like received in the receiver 1811, and various data necessary for an operation of the H3A server 1800, e.g., information related to a key hierarchy generating operation.

Although the receiver 1811, the controller 1813, the transmitter 1815, and the storage 1817 are shown in FIG. 18 as separate units, it is to be understood that this is merely for convenience of description. In other words, two or more of the receiver 1811, the controller 1813, the transmitter 1815, and the storage 1817 may be incorporated into a single unit.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read-only memory (ROM), random-access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD)), a magnetic disk, or a magnetic tape. A method and apparatus according to various embodiments of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to various embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

As is apparent from the foregoing description, an embodiment of the present disclosure enables to dynamically generate a key hierarchy in a wireless network.

An embodiment of the present disclosure enables to generate a key hierarchy in a wireless network thereby decreasing latency.

Various embodiments of the present disclosure enable to generate a key hierarchy in a wireless network thereby decreasing latency and holding an authentication performance.

Various embodiments of the present disclosure enable to generate a key hierarchy in a wireless network thereby removing a unnecessary authentication procedure.

Various embodiments of the present disclosure enable to generate a key hierarchy in a wireless network thereby decreasing latency and enhancing a service quality of a wireless network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for generating a key hierarchy by a mobile station (MS) in a wireless network, the method comprising:
performing a first authentication operation with a server or a second authentication operation with a base station (BS);
determining whether a first value received from the BS is equal to a first value of the MS; and
if the first value received from the BS is equal to the first value of the MS, determining that an authentication for the BS has succeeded,
wherein the second authentication operation is part of the first authentication operation, and
wherein the BS is included in a new key hierarchy if there is an unexpired session security context for the MS.

2. The method of claim 1, further comprising:
after determining that the authentication for the BS has succeeded, transmitting a second value of the MS to the BS.

3. The method of claim 1, further comprising:
if the first value received from the BS is different from the first value of the MS, determining that the authentication for the BS has failed.

4. The method of claim 1, further comprising:
transmitting an authentication request message to the BS,
wherein the authentication request message includes an MS identifier (ID) of the MS and a key ID, and
wherein the key ID is changed whenever a new session key is generated by the MS and the server.

5. A non-transitory computer readable storage medium storing instructions that, if executed, cause at least one processor to perform the method of claim 1.

6. A method for generating a key hierarchy by a base station (BS) in a wireless network, the method comprising:
determining whether there is an unexpired session security context for a mobile station (MS);
generating a new key hierarchy including the BS if there is the unexpired session security context for the MS;

transmitting a first value to the MS;
determining whether a second value received from the MS is equal to a second value of the BS; and
if the second value received from the MS is equal to the second value of the BS, allowing an access to the MS.

7. The method of claim 6, further comprising:
determining that an authentication for the MS has failed if the second value received from the MS is different from the second value of the BS.

8. The method of claim 6, further comprising:
if there is no unexpired session security context for the MS, detecting a closest node based on information related to nodes included in old key hierarchy information included in an authentication request message received from the MS;
transmitting the authentication request message to the closest node; and
receiving an authentication response message from the closest node.

9. A non-transitory computer readable storage medium storing instructions that, if executed, cause at least one processor to perform the method of claim 6.

10. A method for generating a key hierarchy by a node in a wireless network, the method comprising:
receiving an authentication request message from a base station (BS) or other node;
determining, by the node, whether there is an unexpired session security context for a mobile station (MS);
generating a new key hierarchy including the BS if there is the unexpired session security context for the MS;
generating a session security context for a child node of the node; and
transmitting the generated session security context to the child node of the node.

11. The method of claim 10, further comprising:
if there is no unexpired session security context for the MS, detecting a closest node based on information related to nodes included in old key hierarchy information included in the authentication request message;
transmitting the authentication request message to the closest node; and
receiving an authentication response message from the closest node.

12. The method of claim 10, further comprising:
recording at least one of a distance to another node, a round-trip latency relating to signaling with another node, and statistics relating to signaling with another node.

13. The method of claim 12, further comprising:
determining to which node to forward the authentication request message.

14. The method of claim 13, wherein the determining to which node to forward the authentication request message comprises:
determining to which node to forward the authentication request message according to at least one of the recorded distance to another node, the recorded round-trip latency relating to signaling with another node, and the recorded statistics relating to signaling with another node.

15. A non-transitory computer readable storage medium storing instructions that, if executed, cause at least one processor to perform the method of claim 10.

16. A method for generating a key hierarchy by a server in a wireless network, the method comprising:
receiving an authentication request message from a base station (BS) or other node;
determining, by the server, whether there is a unexpired session security context for a mobile station (MS);
if there is the unexpired session security context for the MS, generating a session security context for a child node of the node and a new key hierarchy including the BS; and
transmitting the generated session security context to the child node of the node.

17. The method of claim 16, wherein the generating of the session security context for the child node of the node based on the determining result comprises:
if there is no unexpired session security context for the MS, performing an authentication operation with the MS.

18. A non-transitory computer readable storage medium storing instructions that, if executed, cause at least one processor to perform the method of claim 16.

19. A mobile station (MS) in a wireless network, the MS comprising:
a processor configured to:
perform a first authentication operation with a server or a second authentication operation with a base station (BS),
determine whether a first value received from the BS is equal to a first value of the MS, and
determine that an authentication for the BS has succeeded if the first value received from the BS is equal to the first value of the MS,
wherein the second authentication operation is part of the first authentication operation, and
wherein the BS is included in a new key hierarchy if there is an unexpired session security context for the MS.

20. The MS of claim 19, further comprising a transceiver configured to transmit a second value of the MS to the BS after the processor determines that the authentication for the BS has succeeded.

21. The MS of claim 19, wherein the processor determines that the authentication for the BS has failed if the first value received from the BS is different from the first value of the MS.

22. The MS of claim 19, further comprising a transceiver configured to transmit an authentication request message to the BS,
wherein the authentication request message includes an MS identifier (ID) of the MS and a key ID, and
wherein the key ID is changed whenever a new session key is generated by the MS and the server.

23. A base station (BS) in a wireless network, the BS comprising:
a processor configured to:
determine whether there is an unexpired session security context for a mobile station (MS), and
generate a new key hierarchy including the BS if there is the unexpired session security context for the MS; and
a transceiver configured to transmit a first value to the MS,
wherein the processor determines whether a second value received from the MS is equal to a second value of the BS, and allows an access to the MS if the second value received from the MS is equal to the second value of the BS.

24. The BS of claim 23, wherein the processor determines that an authentication for the MS has failed if the second value received from the MS is different from the second value of the BS.

25. The BS of claim 23,
wherein the processor detects a closest node based on information related to nodes included in old key hierarchy information included in an authentication request message received from the MS if there is no unexpired session security context for the MS, and
wherein the transceiver transmits the authentication request message to the closest node, and receives an authentication response message from the closest node.

26. A node in a wireless network, the node comprising:
a transceiver configured to receive an authentication request message from a base station (BS) or other node; and
a processor configured to:
   determine whether there is a unexpired session security context for a mobile station (MS),
   generate a new key hierarchy including the BS if there is the unexpired session security context for the MS, and
   generate a session security context for a child node of the node,
wherein the transceiver transmits the generated session security context to the child node of the node.

27. The node of claim 26,
wherein the processor detects a closest node based on information related to nodes included in old key hierarchy information included in the authentication request message if there is no unexpired session security context for the MS,
wherein the transceiver transmits the authentication request message to the closest node, and receives an authentication response message from the closest node.

28. A server in a wireless network, the server comprising:
a transceiver configured to receive an authentication request message from a base station (BS) or other node; and
a processor configured to:
   determine whether there is an unexpired session security context for a mobile station (MS), and
   if there is the unexpired session security context for the MS, generate a session security context for a child node of the node and a new key hierarchy including the BS,
wherein the transceiver transmits the generated session security context to the child node of the node.

29. The server of claim 28, wherein the processor performs an authentication operation with the MS if there is no unexpired session security context for the MS.

* * * * *